United States Patent
Wu et al.

(10) Patent No.: US 11,681,432 B2
(45) Date of Patent: Jun. 20, 2023

(54) METHOD AND TERMINAL FOR DISPLAYING INPUT METHOD VIRTUAL KEYBOARD

(71) Applicant: Honor Device Co., Ltd., Guangdong (CN)

(72) Inventors: Haiteng Wu, Nanjing (CN); Yue Zhang, Nanjing (CN)

(73) Assignee: Honor Device Co., Ltd., Shenzhen (CN)

( * ) Notice: Subject to any disclaimer, the term of this patent is extended or adjusted under 35 U.S.C. 154(b) by 0 days.

(21) Appl. No.: 17/054,444

(22) PCT Filed: Jul. 17, 2018

(86) PCT No.: PCT/CN2018/096031
§ 371 (c)(1),
(2) Date: Nov. 10, 2020

(87) PCT Pub. No.: WO2019/214072
PCT Pub. Date: Nov. 4, 2019

(65) Prior Publication Data
US 2021/0216203 A1    Jul. 15, 2021

(30) Foreign Application Priority Data
May 10, 2018 (WO) ................ PCT/CN2018/086401

(51) Int. Cl.
*G06F 3/0482* (2013.01)
*G06F 3/04886* (2022.01)
(Continued)

(52) U.S. Cl.
CPC ........ *G06F 3/04886* (2013.01); *G06F 3/0482* (2013.01); *G06F 3/04883* (2013.01); *H04L 51/04* (2013.01); *H04L 51/08* (2013.01)

(58) Field of Classification Search
CPC .................................................. G06F 3/04886
See application file for complete search history.

(56) References Cited

U.S. PATENT DOCUMENTS 10,802,709 B2 * 10/2020 Won ...................... G06F 3/0482
2011/0078614 A1 * 3/2011 Lee ..................... G06F 3/04886
345/173

(Continued)

FOREIGN PATENT DOCUMENTS

CN    101316411 A    12/2008
CN    102681780 A    9/2012

(Continued)

*Primary Examiner* — Cesar B Paula
*Assistant Examiner* — Sajeda Muhebbullah
(74) *Attorney, Agent, or Firm* — Leydig, Voit & Mayer, Ltd.

(57) ABSTRACT

Embodiments of this application disclose a method and a terminal for displaying an input method virtual keyboard, and relate to the field of terminals, so as to improve input efficiency of a terminal and input experience of a user. The method includes: displaying, by a terminal, a first session interface of a first application on a touchscreen; determining, by the terminal, a first session message on the first session interface, where the first session message is a recently received session message; determining, by the terminal, a corresponding first virtual keyboard based on a type of the first session message, where the type of the first session message includes a text message, a numeric message, an emoticon message, or a voice message; and displaying, by the terminal, the first virtual keyboard on the first session interface.

18 Claims, 34 Drawing Sheets

(51) Int. Cl.
*G06F 3/04883* (2022.01)
*H04L 51/04* (2022.01)
*H04L 51/08* (2022.01)

(56) References Cited

U.S. PATENT DOCUMENTS

| | | | |
|---|---|---|---|
| 2013/0342467 A1 | 12/2013 | Cresp et al. | |
| 2014/0035823 A1* | 2/2014 | Khoe | G06F 3/0237 345/171 |
| 2015/0161099 A1 | 6/2015 | Lee et al. | |
| 2016/0359771 A1 | 12/2016 | Sridhar et al. | |
| 2017/0353414 A1* | 12/2017 | Ertmann | H04L 51/16 |
| 2017/0357443 A1* | 12/2017 | Paek | G06F 3/0482 |
| 2018/0181265 A1* | 6/2018 | Kim | G06F 3/0482 |
| 2019/0004676 A1 | 1/2019 | Deng | |
| 2019/0356770 A1* | 11/2019 | Yu | H04M 1/72436 |
| 2021/0089205 A1* | 3/2021 | Guo | H04M 1/72436 |

FOREIGN PATENT DOCUMENTS

| | | |
|---|---|---|
| CN | 104509080 A | 4/2015 |
| CN | 105120087 A | 12/2015 |
| CN | 105159472 A | 12/2015 |
| CN | 105183439 A | 12/2015 |
| CN | 105227426 A | 1/2016 |
| CN | 105282318 A | 1/2016 |
| CN | 105511796 A | 4/2016 |
| CN | 106774976 A | 5/2017 |
| CN | 106775350 A | 5/2017 |
| CN | 107193476 A | 9/2017 |
| CN | 107300986 A | 10/2017 |
| CN | 107332991 A | 11/2017 |
| CN | 107479822 A | 12/2017 |
| CN | 107704188 A | 2/2018 |
| CN | 107741820 A | 2/2018 |
| WO | WO 2012/178121 A1 | 12/2012 |

* cited by examiner

METHOD AND TERMINAL FOR DISPLAYING INPUT METHOD VIRTUAL KEYBOARD

CROSS-REFERENCE TO RELATED APPLICATIONS

This application is a national stage of International Application No. PCT/CN2018/096031, filed on Jul. 17, 2018, which claims priority to International Application No. PCT/CN2018/086401, filed on May 10, 2018. Both of the aforementioned applications are hereby incorporated by reference in their entireties.

TECHNICAL FIELD

This application relates to the field of terminals, and in particular, to a method and terminal for displaying an input method virtual keyboard.

BACKGROUND

Generally, an input method application is installed on a terminal such as a mobile phone, and a user can input information to the terminal using the input method application. Currently, some input method applications may enable a user to input information using different languages or different types of keyboards. For example, a virtual keyboard provided by an input method application may include a pinyin keyboard, a stroke keyboard, a voice keyboard, an emoticon keyboard, and the like.

Generally, a terminal may set a keyboard as a default main keyboard. For example, the pinyin keyboard is set as the default main keyboard. Then, the pinyin keyboard is always displayed every time the terminal starts the input method application. Therefore, when a user wants to use another keyboard, the user needs to manually switch from the main keyboard to another type of keyboard in the input method application. This not only affects input experience of the user, but also reduces input efficiency of the terminal.

SUMMARY

This application provides a method and terminal for displaying an input method virtual keyboard, so as to improve input efficiency of a terminal and input experience of a user.

To achieve the foregoing object, embodiments of this application use the following technical solutions:

According to a first aspect, a technical solution of this application provides a method for switching an input method virtual keyboard, including: A terminal displays a session interface of an application on a touchscreen, where the session interface refers to a chat interface during a session with a group; the terminal determines a first session message on the session interface, where the first session message is a recently received session message; further, the terminal may determine a corresponding first virtual keyboard based on a type of the first session message, and display the first virtual keyboard on the session interface, so that an input method can automatically display the virtual keyboard corresponding to the type of the first session message when the virtual keyboard is opened, thereby improving input efficiency of the terminal and input experience of a user, where the type of the first session message includes a text message, a numeric message, an emoticon message, a voice message, or the like; subsequently, the terminal may receive a specific character and a first contact that are input by the user into the input box, where the first contact is a contact in the group; the terminal determines a session message recently sent by the first contact in the group as a second session message, and determines a corresponding second virtual keyboard based on a type of the second session message; further, the terminal displays the second virtual keyboard on the session interface and hides the first virtual keyboard, thereby implementing automatic switching between the first virtual keyboard and the second virtual keyboard; subsequently, the terminal may continue to receive a specific character and a second contact that are input by the user into the input box, where the second contact is a contact in the group, and the second contact is different from the first contact; further, the terminal determines a session message recently sent by the second contact in the group as a third session message, and determines a corresponding third virtual keyboard based on a type of the third session message; and the terminal displays a third virtual keyboard on the session interface, and hides the second virtual keyboard (the third virtual keyboard, the second virtual keyboard and the first virtual keyboard may be different from each other), thereby implementing automatic switching between the second virtual keyboard and the third virtual keyboard.

According to a second aspect, another technical solution of this application provides a method for displaying an input method virtual keyboard, including: A terminal displays a first session interface of a first application on a touchscreen; the terminal determines a first session message on a first session interface, where the first session message is a recently received session message; and the terminal determines a corresponding first virtual keyboard based on a type of the first session message, and displays the first virtual keyboard on the first session interface, where the type of the first session message may include a text message, a numeric message, an emoticon message, or a voice message.

That is, the terminal may provide the user with a virtual keyboard of a corresponding type based on the type of the first session message. In this way, when the user opens the virtual keyboard, the terminal can automatically display the virtual keyboard matching the type of the session message based on the latest session message, thereby reducing operations of the user to frequently switch the virtual keyboard in a process of inputting information using an input method APP, and improving the input efficiency of the terminal and the input experience of the user.

In a possible design method, the first session interface may be a chat interface with a first contact, and the first session message refers to a chat message recently sent by the first contact.

Alternatively, the first session interface may be a chat interface during a session with a group, and the first session message refers to a chat message recently sent by a contact in the group.

In a possible design method, after the terminal displays the first virtual keyboard on the first session interface, the method may further includes: The terminal displays a newly received second session message on the first session interface; the terminal determines a corresponding second virtual keyboard based on a type of the second session message; and the terminal displays the second virtual keyboard on the first session interface and hides the first virtual keyboard. In this way, the terminal can switch from the first virtual keyboard currently displayed to the second virtual keyboard on the session interface, so as to implement automatic switching between different virtual keyboards during the session.

In a possible design method, the first session interface includes an input box; then, after the terminal displays the first virtual keyboard on the first session interface, the method further includes: The terminal receives a specific character and a first contact that are input by the user into the input box, where the first contact is a contact in the group session; the terminal determines a session message recently sent by the first contact in the group as a third session message; the terminal determines a corresponding third virtual keyboard based on a type of the third session message; and the terminal displays the third virtual keyboard on the first session interface and hides the first virtual keyboard. In this way, for the session message of a contact in a multi-person session scenario, the terminal can automatically switch the virtual keyboard corresponding to the type of the session message for the user, thereby reducing the quantity of times the user manually switches the keyboard in the multi-person chat scenario.

In a possible design method, after the terminal displays the third virtual keyboard on the first session interface, the method further includes: The terminal receiving a specific character and a second contact that are input by the user into the input box, where the second contact is a contact in the group session; the terminal determines a session message recently sent by the second contact in the group as a fourth session message; the terminal determines a corresponding fourth virtual keyboard based on a type of the fourth session message; and the terminal displays the fourth virtual keyboard on the first session interface and hides the third virtual keyboard.

In a possible design method, the first session interface includes an input box; after the terminal displays the first virtual keyboard on the first session interface, the method further includes: The terminal receives a specific character and a first contact that are input by the user into the input box; the terminal determines a nationality of the first contact; and the terminal displays a virtual keyboard corresponding to the nationality of the first contact on the first session interface, and hides the first virtual keyboard. In this way, the user can use the virtual keyboard corresponding to the nationality of the contact to talk with the contact, thereby improving the input efficiency of the terminal.

In a possible design method, the first virtual keyboard is a keyboard that is provided by a first input method application; and the method further includes: The terminal displays a second session interface of a second application on the touchscreen; the terminal determines a fifth session message on the second session interface, where the fifth session message is a recently received session message; the terminal determines a corresponding fifth virtual keyboard based on a type of the fifth session message, and the fifth virtual keyboard is a keyboard provided by a second input method application; and the terminal displays the fifth virtual keyboard on the second session interface.

In a possible design method, the type of the fifth session message is the same as the type of the first session message; and the type of the fifth virtual keyboard is the same as the type of the first virtual keyboard. That is, the terminal may display the same type of virtual keyboard provided by different input method APPs to the user in different applications based on the user's usage preference when displaying the virtual keyboard, thereby improving input efficiency of the terminal and input experience of the user.

In a possible design method, before the terminal displays the first session interface of the first application on the touchscreen, the method further includes: The terminal displays a contact session list of the first application on the touchscreen, where the contact session list includes at least one chat item and the chat item includes a chat item of a contact or a chat item of a group; and that the terminal displays the first session interface of the first application on the touchscreen specifically includes: displaying the first session interface of the target chat item on the touchscreen in response to an operation of opening a target chat item.

In a possible design method, the virtual keyboard includes a text keyboard corresponding to a text message, a voice keyboard corresponding to a voice message, an emoticon keyboard corresponding to an emoticon message, or a numeric keyboard corresponding to a numeric message; and the emoticon keyboard includes an emoji keyboard corresponding to an emoji message, a kaomoji keyboard corresponding to a kaomoji message, or an emoticon package keyboard corresponding to an emoticon package message.

In a possible design method, the first application is WeChat, and the second application is Alipay; or the contact session list includes a chat item of a first contact, a chat item of a second contact, and a chat item of the session group, and the chat item of the first contact includes at least one unread message; or the virtual keyboard includes a setting button, where the setting button is configured to turn on or off a function of automatically switching the virtual keyboard; the first session message is an emoticon message, and the first virtual keyboard is an emoticon keyboard; or the first session message is a voice message, and the first virtual keyboard is a voice keyboard; or in response to a voice input by a user into the voice keyboard, the terminal inputs text or audio information corresponding to the voice into the input box; and the terminal inputs the text or audio information into the input box on the first session interface in response to a sending operation performed by the user on the voice keyboard.

According to a third aspect, another technical solution of this application provides a terminal for displaying an input method virtual keyboard, including: a display unit, a determining unit, and a receiving unit. The display unit is configured to display a session interface of an application, where the session interface may be a chat interface during a group session. The determining unit is configured to: determine a first session message on the session interface displayed by the display unit, where the first session message is a recently received session message; and determine a corresponding first virtual keyboard based on a type of the first session message, where the type of the first session message includes a text message, a numeric message, an emoticon message, or a voice message. The display unit is further configured to display the first virtual keyboard on the session interface. The receiving unit is configured to receive a specific character and a first contact that are input by a user into the input box, where the first contact is a contact in the group. The determining unit is further configured to: determine a session message recently sent by the first contact in the group as a second session message; and determine a corresponding second virtual keyboard based on a type of the second session message. The display unit is further configured to display the second virtual keyboard on the session interface and hide the first virtual keyboard. The receiving unit is further configured to receive a specific character and a second contact that are input by the user into the input box, where the second contact is a contact in the group, and the second contact is different from the first contact. The determining unit is further configured to: determine a session message recently sent by the second contact in the group as a third session message; and determine a corresponding third virtual keyboard based on a type of the third session message. The display unit is further configured to display the third virtual keyboard on the session interface and hide the second virtual keyboard, where the third virtual keyboard, the second virtual keyboard and the first virtual keyboard are different from each other.

According to a fourth aspect, another technical solution of this application provides a terminal for displaying an input method virtual keyboard, including a display unit and a determining unit. The display unit is configured to display a first session interface of a first application. The determining unit is configured to: determine a first session message on a first session interface displayed by the display unit, where the first session message is a recently received session message; and determine a corresponding first virtual keyboard based on a type of the first session message, where the type of the first session message includes a text message, a numeric message, an emoticon message, or a voice message. The display unit is further configured to display the first virtual keyboard on the first session interface.

In a possible design method, the terminal may further include a receiving unit, configured to receive a newly received second session message on a first session interface. The determining unit is further configured to determine a corresponding second virtual keyboard based on a type of the second session message. The display unit is further configured to display the second virtual keyboard on the first session interface and hide the first virtual keyboard.

In a possible design method, the receiving unit is further configured to receive a specific character and a first contact that are input by the user into the input box, where the first contact is a contact in the group session. The determining unit is further configured to: determine a session message recently sent by the first contact in the group as a third session message; and determine a corresponding third virtual keyboard based on a type of the third session message. The display unit is further configured to display the third virtual keyboard on the first session interface and hide the first virtual keyboard.

In a possible design method, the receiving unit is further configured to receive a specific character and a second contact that are input by the user into the input box, where the second contact is a contact in the group session. The determining unit is further configured to: determine a session message recently sent by the second contact in the group as a fourth session message; and determine a corresponding fourth virtual keyboard based on a type of the fourth session message. The display unit is further configured to display the fourth virtual keyboard on the first session interface and hide the third virtual keyboard.

In a possible design method, the receiving unit is further configured to receive a specific character and a first contact that are input by the user into the input box. The determining unit is further configured to determine a nationality of the first contact. The display unit is further configured to display a virtual keyboard corresponding to the nationality of the first contact on the first session interface and hide the first virtual keyboard.

In a possible design method, the display unit is further configured to display a second session interface of the second application on the touchscreen. The determining unit is further configured to: determine a fifth session message on the second session interface, where the fifth session message is a recently received session message; and determine a corresponding fifth virtual keyboard based on a type of the fifth session message, where the fifth virtual keyboard is a keyboard provided by the second input method application. The display unit is further configured to display the fifth virtual keyboard on the second session interface.

In a possible design method, the display unit is further configured to: display a contact session list of the first application, where the contact session list includes at least one chat item, and the chat item includes a chat item of a contact or a chat item of a group; and display a first session interface on the touchscreen for a target chat item in response to an operation of opening the target chat item.

According to a fifth aspect, another technical solution of this application provides a terminal, including a touchscreen, one or more processors, a memory, a plurality of application programs, and one or more programs; where the processor is coupled to the memory, the one or more programs are stored in the memory, and when the terminal is running, the processor executes the one or more programs stored in the memory so that the terminal is enabled to perform any of the foregoing methods for switching/displaying an input method virtual keyboard According to a sixth aspect, another technical solution of this application provides a computer-readable storage medium, where the computer-readable storage medium stores an instruction, and when the instruction is run on any one of the foregoing terminals, the terminal is enabled to perform any of the foregoing methods for switching/displaying an input method virtual keyboard.

According to a seventh aspect, another technical solution of this application provides a computer program product including an instruction, where when the computer program product is run on a terminal, the terminal is enabled to perform any one of the foregoing methods for switching/displaying an input method virtual keyboard.

In this application, names of the components in the foregoing terminal do not constitute a limitation on the device; and in actual implementation, these components may appear under other names. These components fall within the scope of the claims of this application and their equivalents, provided that functions of the components are similar to those of the components in the embodiments of this application.

In addition, for technical effects of any one of the design methods in the third aspect to the seventh aspect, reference may be made to the technical effects of different design methods in the first aspect or the second aspect, and details are not described herein again.

DESCRIPTION OF EMBODIMENTS

The method for displaying an input method virtual keyboard provided in embodiments of this application can be applied to a terminal. For example, the terminal may be a tablet computer, a desktop computer, a laptop computer, an ultra-mobile personal computer (ultra-mobile personal computer, UMPC), a handheld computer, a netbook, a personal digital assistant (personal digital assistant, PDA), a wearable electronic device, a smartwatch, or the like, or may be a mobile phone 100 shown in FIG. 1. A specific form of the terminal is not particularly limited in the embodiments of this application.

Figure 1:
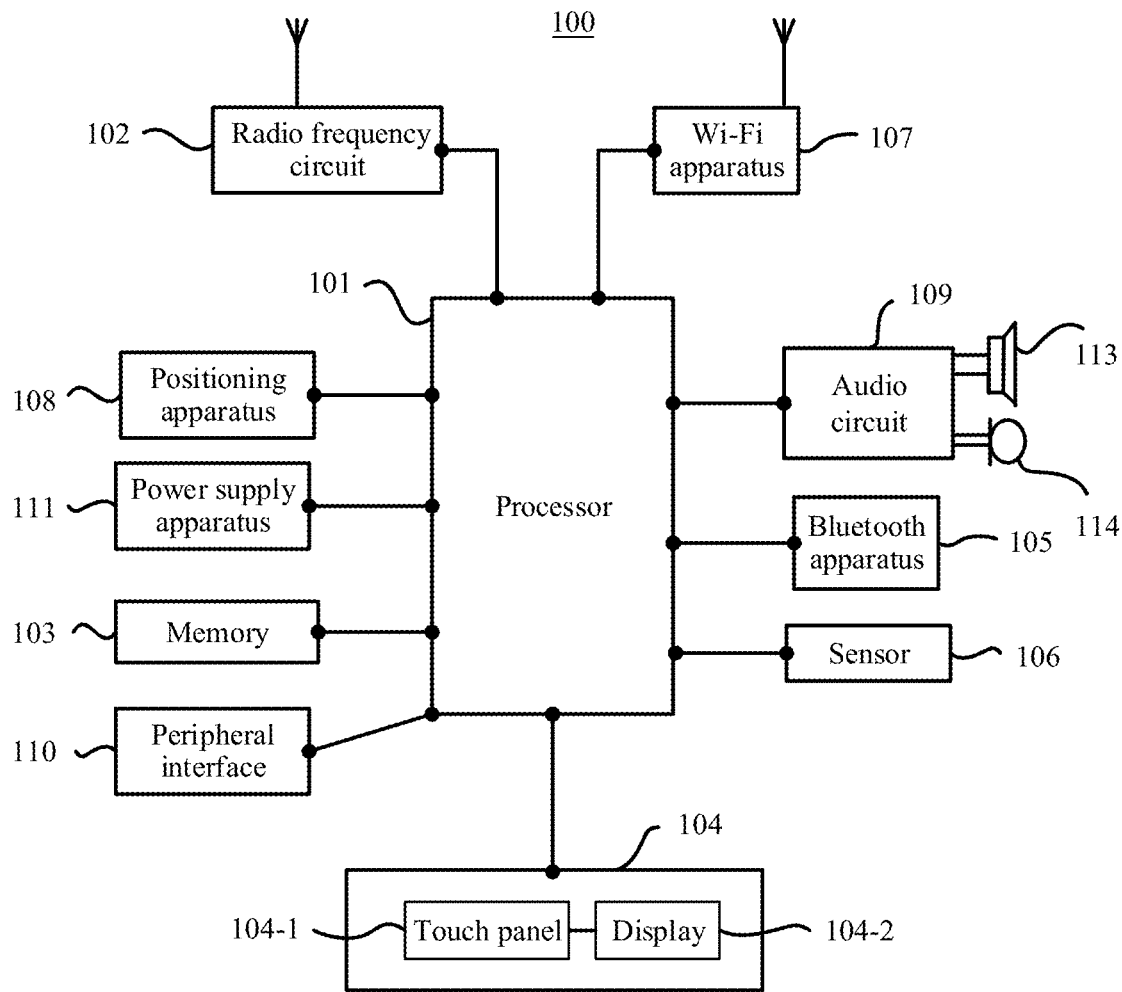
FIG. 1 is a first schematic structural diagram of a terminal according to an embodiment of this application.

As shown in FIG. 1, the terminal in the embodiments of this application may be the mobile phone 100. This embodiment is described in detail below by using the mobile phone 100 as an example. It should be understood that the illustrated mobile phone 100 is only one example of a terminal, and the mobile phone 100 may have more or fewer components than those shown in the figure, may combine two or more components, or may have a different component configuration. The components shown in the figure may be implemented by hardware (including one or more signal processors or application specific integrated circuits), software, or a combination of hardware and software.

As shown in FIG. 1, the mobile phone 100 may include components such as a processor 101, a radio frequency (radio frequency, RF) circuit 102, a memory 103, a touchscreen 104, a Bluetooth apparatus 105, one or more sensors 106, a Wi-Fi apparatus 107, a positioning apparatus 108, an audio circuit 109, a peripheral interface 110, and a power supply apparatus 111. These components may communicate using one or more communications buses or signal lines (not shown in FIG. 1). The hardware structure shown in FIG. 1 does not constitute a limitation on the mobile phone 100. The mobile phone 100 may include components more or fewer than those shown in FIG. 1, combine some components, or have a different component arrangement.

The components of the mobile phone 100 are described in detail below with reference to FIG. 1.

As a control center of the mobile phone 100, the processor 101 connects various parts of the mobile phone 100 using various interfaces and lines, and performs various functions and data processing of the mobile phone 100 by running or executing an application program stored in the memory 103, and invoking data and instructions stored in the memory 103. In some embodiments, the processor 101 may include one or more processing units; the processor 101 may also integrate an application processor and a modem processor, where the application processor mainly processes an operating system, a user interface, an application program, and the like, and the modem processor mainly processes wireless communication. It can be understood that the modem processor may alternatively be not integrated into the processor 101. For example, the processor 101 may be a Kirin 960 multi-core processor manufactured by Huawei Technologies Co., Ltd.

The radio frequency circuit 102 may be configured to receive and transmit wireless signals during transmission and reception of information or during a call. Specifically, the radio frequency circuit 102 may receive downlink data of a base station and then send the downlink data to the processor 101 for processing. In addition, related uplink data is transmitted to the base station. Generally, the radio frequency circuit includes, but is not limited to, an antenna, at least one amplifier, a transceiver, a coupler, a low noise amplifier, a duplexer, and the like. In addition, the radio frequency circuit 102 may communicate with another device through wireless communication. The wireless communication may use any communications standard or protocol, including, but not limited to, Global System for Mobile Communications, General Packet Radio Service, Code Division Multiple Access, Wideband Code Division Multiple Access, Long Term Evolution, email, Short Message Service, and the like.

The memory 103 is configured to store an application program and data. The processor 101 performs various functions and data processing of the mobile phone 100 by running the application program and data stored in the memory 103. The memory 103 mainly includes a program storage area and a data storage area, where the program storage area can store an operating system, an application program (such as a sound playing function or an image playing function) required by at least one function; and the data storage area may store data (such as audio data or a phone book) created based on use of the mobile phone 100. In addition, the memory 103 may include a high-speed random access memory, and may also include a non-volatile memory, such as a magnetic disk storage device, a flash memory device, or another volatile solid-state storage device. The memory 103 may store various operating systems, such as an IOS® operating system developed by Apple Inc. and an ANDROID® operating system developed by Google.

The touchscreen 104 may include a touch-sensitive surface 104-1 and a display 104-2.

The touch-sensitive surface 104-1 (for example, a touch panel) may collect a touch event (for example, an operation performed by a user on or near the touch-sensitive surface 104-1 using any suitable object such as a finger or a stylus) performed by a user of the mobile phone 100, and send the collected touch information to another device such as the processor 101. The touch event performed by the user near the touch-sensitive surface 104-1 may be referred to as a floating touch. The floating touch may mean that a user does not need to directly contact a touch panel for selecting, moving, or dragging an object (for example, an icon), but only needs to be near a terminal so as to perform a desired function. In an application scenario of the floating touch, terms "touch" does not imply that the touchscreen is directly touched, but implies a touch is performed near the touchscreen. The touch-sensitive surface 104-1 supporting a floating touch may be implemented as a capacitive touch-sensitive surface, an infrared light sensing touch-sensitive surface, an ultrasonic wave touch-sensitive surface, or the like. The touch-sensitive surface 104-1 may include two parts: a touch detection apparatus and a touch controller. The touch detection apparatus detects a touch orientation of the user, detects a signal generated by a touch operation, and transmits the signal to the touch controller. The touch controller receives touch information from the touch detection device, converts the touch information into touch coordinates, and sends the touch coordinates to the processor 101. The touch controller may further receive and perform an instruction sent by the processor 101. In addition, the touch-sensitive surface 104-1 may be implemented as a resistive touch-sensitive surface, a capacitive touch-sensitive surface, an infrared ray touch-sensitive surface, a surface acoustic wave touch-sensitive surface, or the like.

The display (also referred to as a display screen) 104-2 may be configured to display information input by or provided to a user and various menus of the mobile phone 100. The display 104-2 may be configured in a form of a liquid crystal display, an organic light emitting diode, or the like. The touch-sensitive surface 104-1 may overlay the display 104-2. When the touch-sensitive surface 104-1 detects a touch event performed on or a near the touch-sensitive surface 104-1, the touch-sensitive surface 104-1 transmits the touch event to the processor 101 to determine a type of the touch event, and then the processor 101 may provide a corresponding visual output on the display 104-2 based on the type of the touch event. Although in FIG. 1, the touch-sensitive surface 104-1 and the display screen 104-2 are implemented as two separate components to implement input and output functions of the mobile phone 100, in some embodiments, the touch-sensitive surface 104-1 and the display screen 104-2 may be integrated to implement the input and output functions of the mobile phone 100. It can be understood that the touchscreen 104 is formed by stacking a plurality of layers of materials. In this embodiment, only a touch-sensitive surface (layer) and a display screen (layer) are shown, and another layer is not described in this embodiment. In addition, in some other embodiments of this application, the touch-sensitive surface 104-1 may overlay the display 104-2, and a size of the touch-sensitive surface 104-1 is greater than that of the display screen 104-2, so that the display screen 104-2 is completely overlaid under the touch-sensitive surface 104-1; or the touch-sensitive surface 104-1 may be disposed on a front side of the mobile phone 100 in a form of a full panel, that is, a touch performed the user on the front surface of the mobile phone 100 can be sensed by the mobile phone, thereby implementing a full touch experience on the front side of the mobile phone. In some other embodiments, the touch-sensitive surface 104-1 is disposed on a front side of the mobile phone 100 in a form of a full panel, and the display screen 104-2 may be disposed on the front side of the mobile phone 100 in the form of a full panel, thereby implementing a frameless structure on the front side of the mobile phone. In some other embodiments of this application, the touchscreen 104 may further include one or more sets of sensor arrays, so that the touchscreen 104 can sense pressure applied by the user and the like while sensing a touch event performed on the touchscreen 104.

The mobile phone 100 may further include a Bluetooth apparatus 105 for implementing data exchange between the mobile phone 100 and another short-range terminal (for example, a mobile phone or a smartwatch). The Bluetooth apparatus in this embodiment of this application may be an integrated circuit, a Bluetooth chip, or the like.

The mobile phone 100 may further include at least one sensor 106, such as a light sensor, a motion sensor, or another sensor. Specifically, the light sensor may include an ambient light sensor and a proximity sensor. The ambient light sensor can adjust brightness of the display of the touchscreen 104 based on brightness of the ambient light. The proximity sensor can power off the display when the mobile phone 100 moves to an ear. As a type of motion sensor, an acceleration sensor can detect an acceleration value in each direction (generally three axes), and detect a value and a direction of gravity when the acceleration sensor is stationary, and is applicable to an application for recognizing a mobile phone posture (for example, a switch between landscape and portrait screens, relevant games, and magnetometer posture calibration), a function related to vibration recognition (such as a pedometer or a knock), and the like. Other sensors such as a fingerprint sensor, a gyroscope, a barometer, a hygrometer, a thermometer, and an infrared sensor may also be disposed on the mobile phone 100, and details are not described herein.

A Wi-Fi apparatus 107 is configured to provide network access to the mobile phone 100 in accordance with the Wi-Fi related standard protocol. The mobile phone 100 can access a Wi-Fi access point through the Wi-Fi apparatus 107, to assist the user in sending and receiving emails, browsing web pages, accessing streaming media, and the like. The Wi-Fi apparatus 107 provides the user with wireless broadband Internet access. In some other embodiments, the Wi-Fi apparatus 107 may alternatively serve as a Wi-Fi wireless access point and may provide Wi-Fi network access for another terminal.

A positioning apparatus 108 is configured to provide a geographical location for the mobile phone 100. It can be understood that the positioning apparatus 108 may be specifically a receiver of a positioning system such as a Global Positioning System (global positioning system, GPS) or the BeiDou Navigation Satellite System. After receiving the geographical location sent by the foregoing positioning system, the positioning apparatus 108 sends the information to the processor 101 for processing, or sends the information to the memory 103 for storage. In some other embodiments, the positioning apparatus 108 may be a receiver of an assisted global positioning system (assisted global positioning system, AGPS. The AGPS is an operation mode of GPS positioning with certain assistance. The AGP may use a signal of a base station in combination with a GPS satellite signal, so that the mobile phone 100 can be positioned faster. In the AGPS system, the positioning apparatus 108 may obtain positioning assistance through communication with an assisted positioning server (such as a mobile phone positioning server) The AGPS system serves as an auxiliary server to assist the positioning apparatus 108 in completing ranging and positioning services. In this case, the assisted positioning server communicates with a positioning apparatus (namely, a GPS receiver) of a terminal (for example, the positioning apparatus 100) through a wireless communications network, so as to provide positioning assistance.

An audio circuit 109, a loudspeaker 113, and a microphone 114 may provide an audio interface between the user and the mobile phone 100. The audio circuit 109 may transmit, to the loudspeaker 113, an electrical signal converted from received audio data, and the loudspeaker 113 converts the electrical signal into a sound signal for output. In addition, the microphone 114 converts the collected sound signal into an electrical signal, and the audio circuit 109 converts the electrical signal into audio data upon receipt of the electrical signal, and outputs the audio data to the RF circuit 102 for transmission to, for example, another mobile phone, or outputs the audio data to the memory 103 for further processing.

The peripheral interface 110 is configured to provide various interfaces for input/output peripherals such as a keyboard, a mouse, an external display, an external memory, and a subscriber identity module card. For example, the mobile phone 100 may be connected to a mouse through a universal serial bus interface, or may be electrically connected to a subscriber identity module (subscriber identity module, SIM) card provided by a telecommunications operator through a metal contact on a card slot for the subscriber identity module. The peripheral interface 110 may be configured to couple the foregoing external input/output peripherals to the processor 101 and the memory 103.

The mobile phone 100 may further include a power supply apparatus 111 (such as a battery and a power management chip) for supplying power to various components. The battery may be logically connected to the processor 101 through the power management chip, so that functions such as charging, discharging, and power consumption management are managed using the power supply apparatus 111.

Although not shown in FIG. 1, the mobile phone 100 may further include a camera, a flash lamp, a micro-projection apparatus, a near field communication (near field communication, NFC) apparatus, and the like, and details are not described herein.

For example, an Android® operating system may be stored in the memory 120 of the mobile phone 100, where the Android® operating system is a linux-based mobile device operating system, and implements a wide variety of functions in combination with the foregoing hardware in the mobile phone 100. A software architecture of the stored Android® operating system is described in detail below. It should be noted that in the embodiments of this application, the Android® operating system is merely used as an example to illustrate a software environment required by the terminal to implement the technical solutions of the embodiments. Those skilled in the art can understand that the embodiments of this application may be implemented using another operating system.

Figure 2:
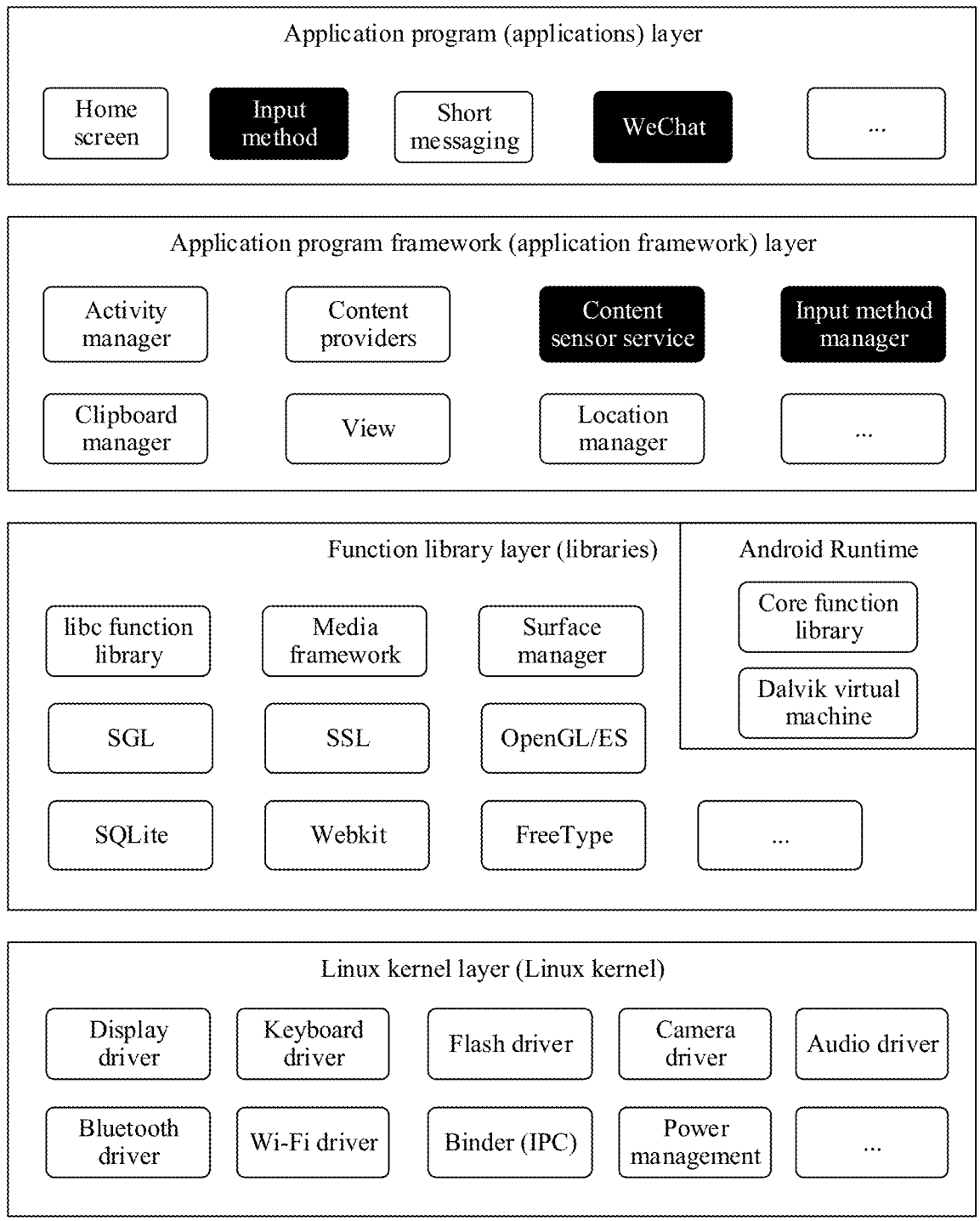
FIG. 2 is a schematic diagram of a software architecture of an ANDROID® operating system according to this application.

For example, FIG. 2 is a schematic diagram of a software architecture of an Android® operating system that may run in the foregoing terminal. The software architecture may be divided into four layers: an application program layer, an application program framework layer, a function library layer, and a linux kernel layer.

1. Application Program (Applications) Layer

The application program layer is the uppermost layer of the operating system, including native application programs of the operating system, such as email clients, short messages, calls, calendars, browsers, and contacts. Certainly, a developer may write an application program and install the application program at the application program layer.

In the embodiments of this application, one or more chat applications, such as WeChat, QQ or SMS, are installed at the application program layer. In addition, one or more input method applications, such as a Baidu input method and a Sogou input method, are installed at the application program layer. This is not limited in the embodiments of this application.

Generally, an application program is developed using a Java language by invoking an application programming interface (application programming interface, API) provided by an application program framework layer.

2. Application Framework (Application Framework) Layer

The application program framework layer mainly provides developers with various APIs for accessing application programs, and the developers can interact with a bottom layer (for example, a function library or a linux kernel of an operating system through the application program framework to develop their own application. The application program framework is mainly a series of services and management systems of the android operating system. The application program framework mainly includes the following basic services:

an activity manager (activity manager), used to manage a life cycle of an application program and provide a common navigation fallback function;

a content provider (content providers), used to manage data sharing and access between different application programs;

a notification manager (notification manager), used to control an application program to display prompt information (for example, an alert (alerts) or a notification (notifications) on a status bar, a lock screen interface, or the like for a user;

a resource manager (resource manager), used to provide a non-code resource (for example, a string, a graphic, and a layout file (layout file)) for use by an application program;

a clipboard manager (clipboard manager): mainly used to provide a copy or paste function inside or between application programs;

a view: A rich and scalable view set is available, which can be used to build an application program; and specifically, a view may be one of a plurality of types such as list (list), grid (grid), text (text), button (button), and image (image); and a location manager (location manager): mainly used to enable an application program to access a geographical location of a terminal.

As shown in FIG. 2, the application program framework layer further includes an input method manager (input method manager, IMM). Implementation of an input method requires participation of various layers of the android operating system. Various drivers at the linux kernel layer are needed to identify a user input. An application program that needs to invoke the input method runs at the application program layer. The application program framework layer is used to display content of an application program, a user interface (user interface, UI), a notification, and the like. The function library layer provides function support for operation of the input method, such as code parsing, support of fonts and graphics, and display of an input animation effect.

Specifically, an input method framework (input method framework, IMF) is a system component of the android operating system. A developer can develop an input method application based on the IMF. Referring to FIG. 2, the IMF mainly includes three parts: the input method manager, an input method editor, and a client application program.

1. The input method manager is a central point for managing interactions between other parts of the IMF. The input method manager may be viewed as a client API, exists in the context of individual applications, and is used to communicate with a global system service that manages all inter-process interactions.

2. The input method editor (input method editor, IME) is used to implement a specific interaction model, where the interaction model allows a user to generate a text message and process a user input. The system binds an input method currently in use to create and run the input method, and determines when to hide or display a UI of the input method. Only one IME can run at a time.

3. A client application (client applications, CA) refers to an application program that currently invokes an input method, such as WeChat or SMS, and controls an input focus and a state of the IME through the IMM. Only one client application can use IME at a time.

These three parts need to work together so that an input method can be used. For example, an application program that needs to invoke the input method is started. When an input box obtains an input focus, the CA instructs the IMM to start the input method, and then the IMM views the currently selected IME and invokes the IME. When the user submits an input, the IME transfers the input information to the CA to complete the input.

Figure 3:
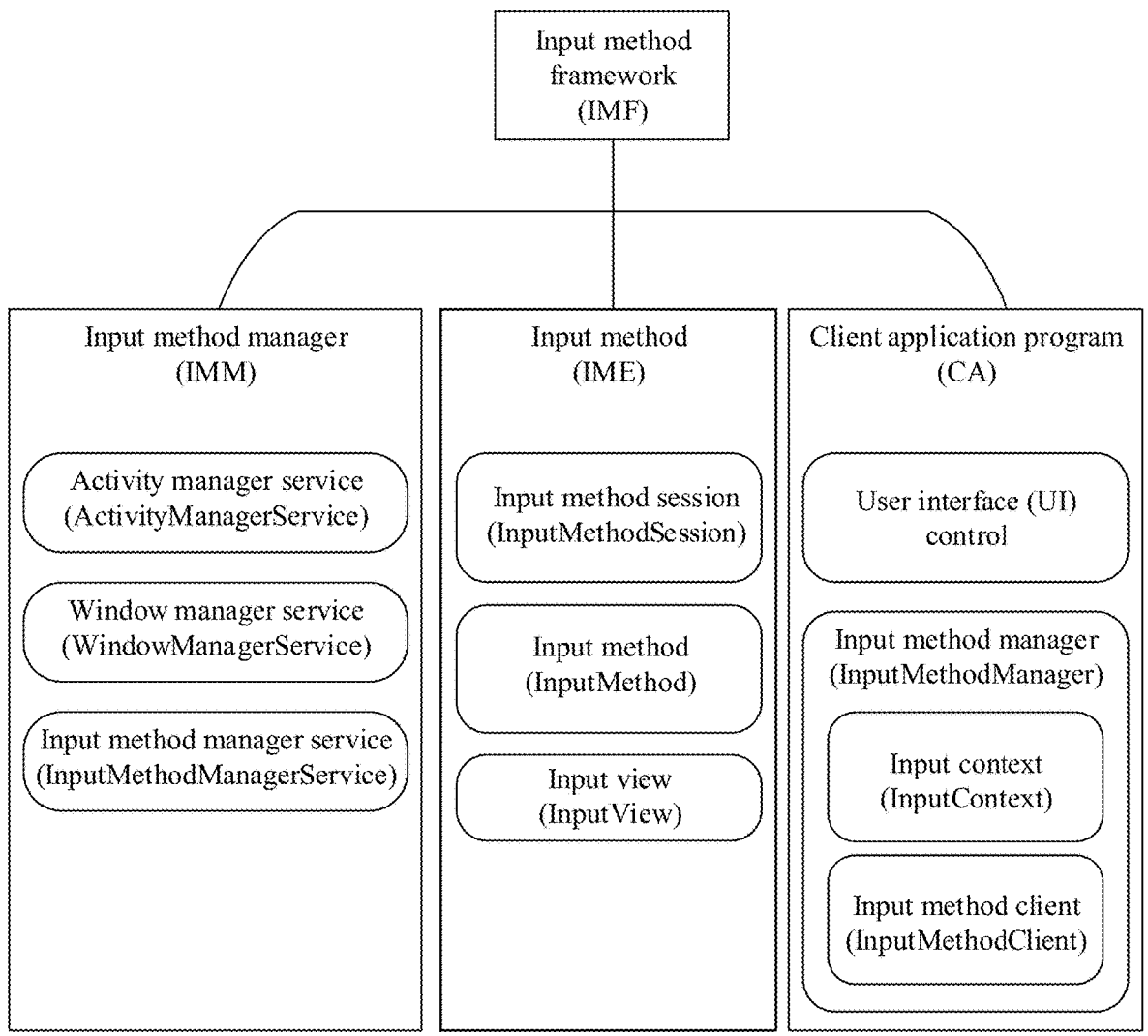
FIG. 3 is an architectural diagram of an input method framework.

An interaction process of the three parts of the IMF is described below with reference to FIG. 3.

The IMM is used to bind the IME and the CA and perform some parameter settings and security control on an input method module, and plays a coordinating role. An input method manager service process of the IMM is a control center related to input methods; and the CA requests, through the control center, to invoke an input method. A window manager service process is responsible for displaying an input method, receiving a user event, and obtaining focus authentication. The input method manager service process of the IMM obtains information about a currently bound CA by using an input method client process of the CA, such as an input box type. The input method manager service process of the IMM starts, modifies, and hides the IME by using an input view process of the IME.

IME: Receives key input information of a user, and invokes a client interface to transmit the input information to the CA. The input view process may obtain input information of the user from a touchscreen, or may process text information of the CA by using an input context (input connection) process of the CA, such as deleting a character, replacing a character, or controlling a cursor position.

The CA is used to display the input information of the user and provide content of the current text box for the IME. An input method manager process of the CA indirectly controls displaying or hiding of the IME by using the input method manager service process of the IMM. An input method manager (input method session wrapper) process of the CA provides the IME with a status of the current text box (such as a cursor change) by using the input method session (input method session wrapper) process of the IME, so that the IME adjusts an input status. A UI control can process some key information that is not processed by the IME (such as home key information), so that the key information directly reaches the CA. The input context (input connection) process can display the input information in the user interface after an interaction between the CA and the IME is completed. An input method client process is implemented as a client of the input method management service, and is used to identify the client of the input method and receive a state change from a management server.

Generally, an input method application 12 at the application program layer may support a variety of virtual keyboards (or referred to as soft keyboards). For example, the input method application 12 is provided with a pinyin keyboard of a nine-grid type, a pinyin keyboard of a full-keyboard type, an English keyboard, a numeric keyboard, an emoticon keyboard, a voice keyboard, and the like. This is not limited in this embodiment.

Figure 4A:
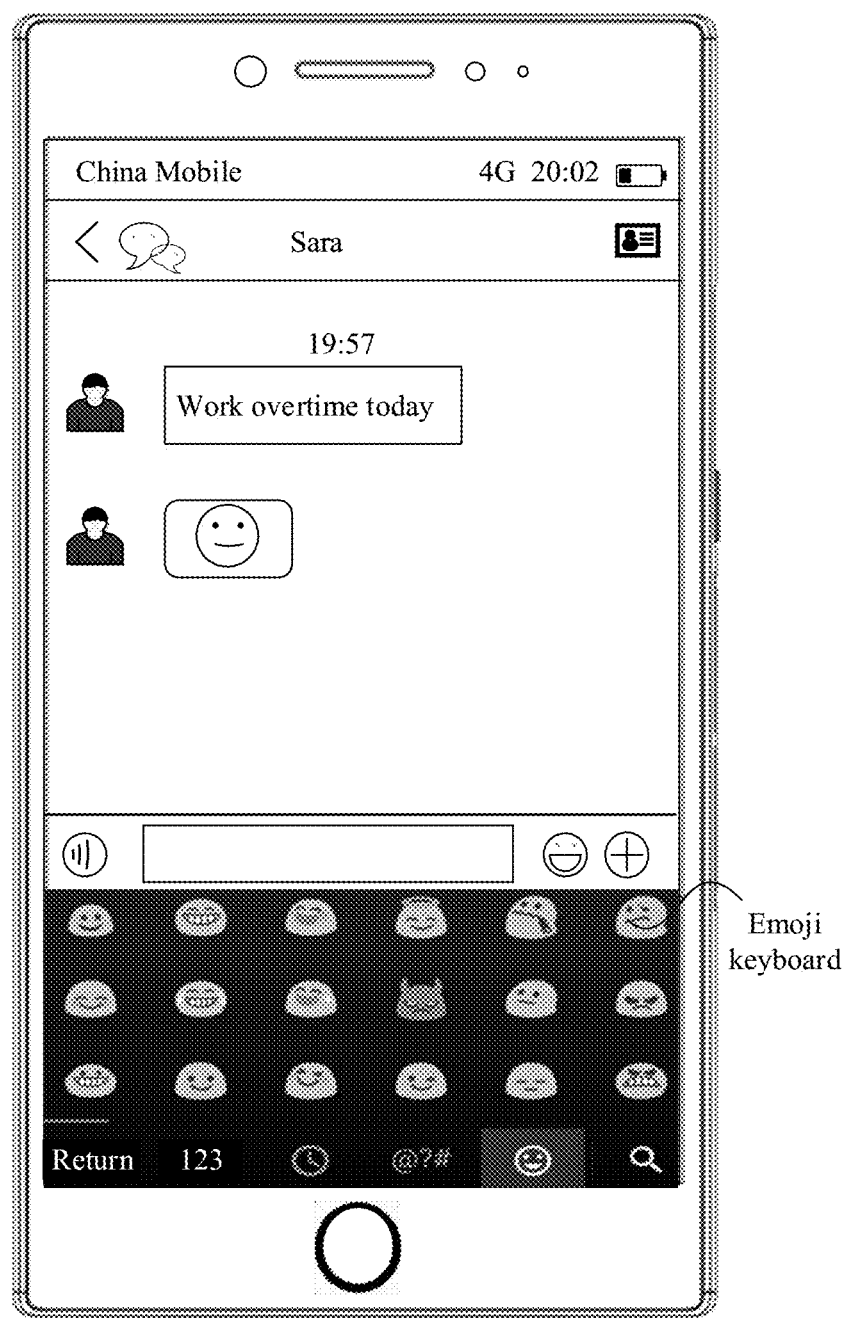
FIG. 4A to FIG. 4C are schematic diagrams of a series of emoticon keyboards according to an embodiment of this application.
Figure 4B:
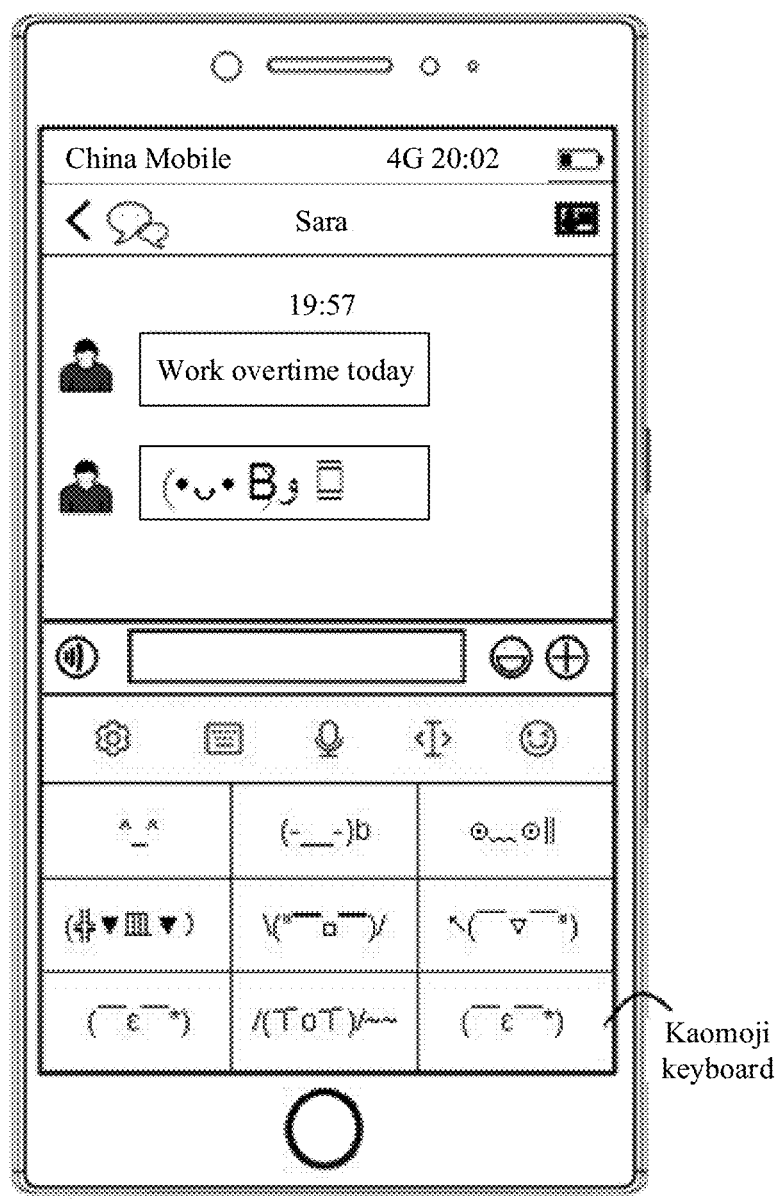
Figure 4C:

For example, an emoticon keyboard may include elements such as emoticons, symbols, images, or animations. For example, as shown in FIG. 4A, an emoticon keyboard displayed on the touchscreen is an emoji keyboard, and the emoji keyboard includes a variety of emoticon elements. As shown in FIG. 4B, an emoticon keyboard displayed on the touchscreen is a kaomoji (kaomoji) keyboard, and the kaomoji keyboard includes emoticons composed of symbol elements. As shown in FIG. 4C, an emoticon keyboard displayed on the touchscreen is an emoticon keyboard, and the emoticon keyboard may include images or animations.

Figure 5A:
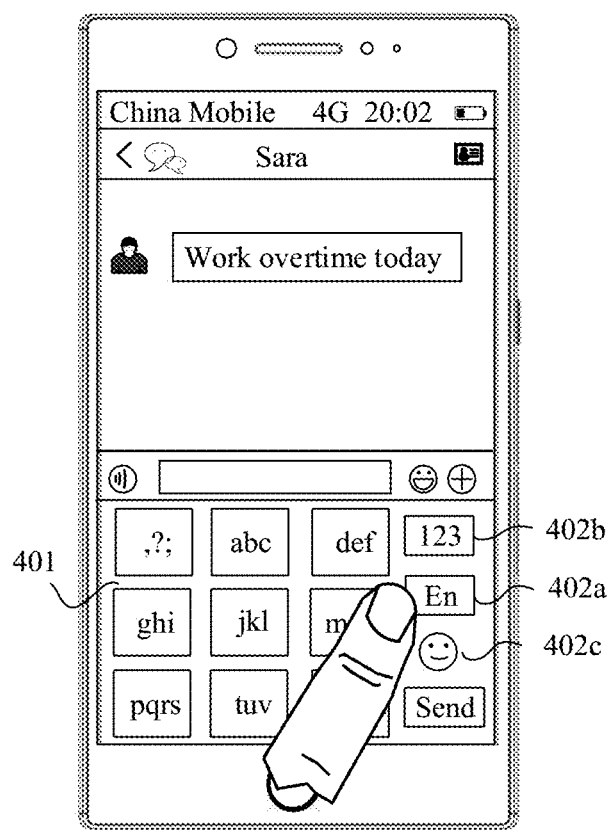
FIG. 5A and FIG. 5B are a first schematic diagram of a series of scenarios where an input method virtual keyboard is displayed according to an embodiment of this application.

In some embodiments of this application, the terminal may detect a type of an input field and provide a suitable virtual keyboard based on the type of the input field. For example, when the terminal detects that the input field displayed on the touchscreen is of a text type, the input method application 12 may display a pinyin keyboard of a full-keyboard type; or when the terminal detects that the input box displayed on the touchscreen is of a numeric type, the input method application 12 may display a numeric keyboard A virtual keyboard provided by the input method application 12 may further include a switching button for switching between the foregoing types of keyboards. As shown in FIG. 5A, a virtual keyboard displayed on the touchscreen is a pinyin keyboard 401 of a nine-grid type, and the pinyin keyboard 401 includes a switching button 402. The switching button 402 may specifically include a button 402a for switching to an English keyboard, a button 402b for switching to a numeric keyboard, a button 402c for switching to an emoticon keyboard, and the like. This is not limited in this application. Certainly, the input method application 12 may be provided with a switching button 402, and the user may sequentially switch the virtual keyboard currently displayed in a certain order by clicking the switching button 402 for a plurality of times.

Figure 5B:
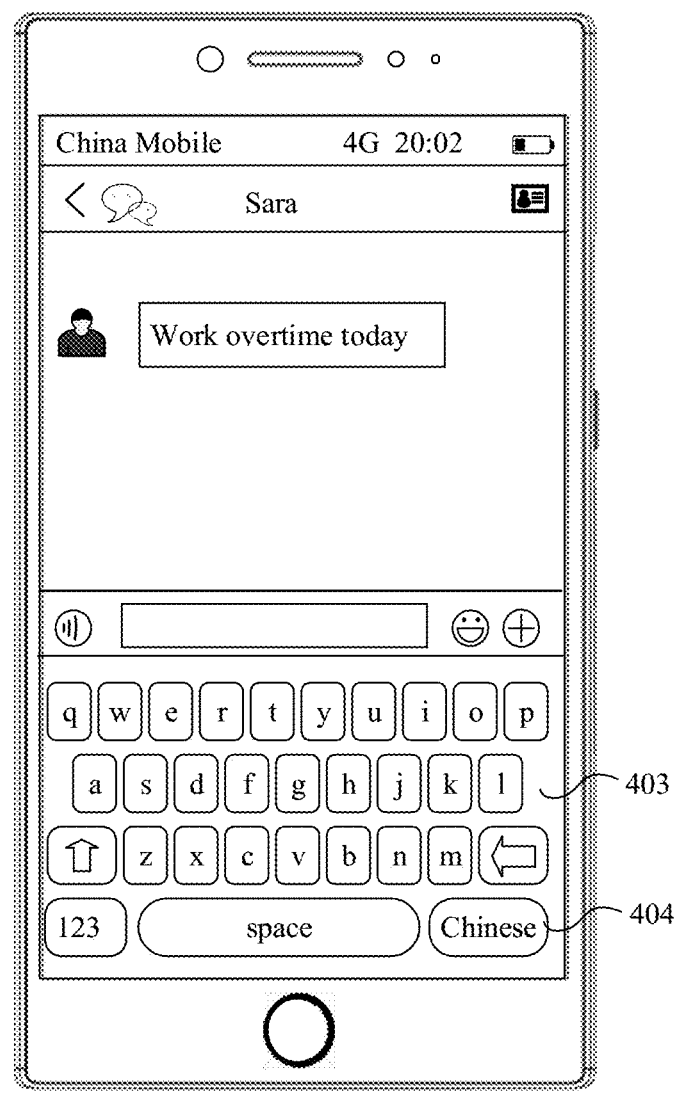

For example, after detecting an input operation in which the user clicks the switching button 402 (for example, the foregoing button 402a) from the pinyin keyboard 401, the input method application 12 may send an input event corresponding to the input operation to an input method manager 11. The input method manager 11 maintains an identifier of each virtual keyboard of the input method application 12. For example, an identifier corresponding to the pinyin keyboard 401 is 1, and an identifier corresponding to the English keyboard 403 is 0. Then, the input method manager 11 may transfer the keyboard identifier (for example, 0) corresponding to the English keyboard to the input method application 12 based on the foregoing input event. In this case, as shown in FIG. 5B, the input method application 12 may switch from the pinyin keyboard 401 of a nine-grid type to an English keyboard 403 based on the keyboard identifier. A switching button in the English keyboard 403 may include a button 404 for switching back to the pinyin keyboard 401.

Further, as shown in FIG. 2, in this embodiment of this application, the application program framework layer further provides a content sensor service (content sensor service) that is open to an input method application. The content sensor service is used to obtain a chat message or a type of a chat message on a chat interface in a chat application (such as WeChat), for example, a chat message of a text type, a chat message of a voice type, or a chat message of an image type. A specific method for obtaining a chat message or a type of a chat message by a terminal will be described in the following embodiments, and therefore details are not described herein.

An input method application may be pre-registered in the content sensor service. For example, the input method application may register its own package name with the content sensor service and request the content sensor service to monitor a newly generated chat message on a chat interface of WeChat. In this way, when a new chat message is generated on the chat interface, the content sensor service may extract the chat message and determine a specific type of the chat message. Further, the content sensor service may send a specific type of the chat message to the input method application, so that the input method application may display a virtual keyboard of a corresponding type on the chat interface based on the specific type. For example, when the latest chat message is of a voice type, the input method application may display a voice keyboard correspondingly; or when the latest chat message is of an emoticon type, the input method application may correspondingly display an emoticon keyboard.

That is, the terminal may automatically display a virtual keyboard matching the type of the chat message based on the latest chat message, thereby reducing operations of the user to frequently switch the virtual keyboard in the process of using the input method to apply the input information, and improving the input efficiency of the terminal and the input experience of the user.

In some embodiments of this application, the input method application may alternatively invoke the foregoing content sensor service to actively obtain the latest chat message or a type of a chat message. For example, the input method application may invoke the foregoing content sensor service to obtain the latest chat message when the user clicks the input box of WeChat. Alternatively, the content sensor service may actively send the latest chat message to the input method application when the virtual keyboard of the input method is not hidden, so that the input method application may quickly switch the type of the virtual keyboard based on a type of the latest chat message in the process of displaying the virtual keyboard. For a specific display method of the foregoing input method virtual keyboard, reference may be made to related descriptions in the following embodiments. Therefore, details are not described herein.

3. Function Library (Libraries) Layer

The function library layer is support for the application program framework, and is an important link between the application program framework layer and the linux kernel layer. The function library layer includes some function libraries compiled by using computer programming language C or C++. These libraries can be used by different components in the operating system, and these libraries serve developers through the application program framework layer. Specifically, the function library may include a libc function library, where the libc function library is customized for embedded linux-based devices; the function library may further include a media framework (media framework), where the media framework supports playback and recording of audio or video in a variety of encoding formats, supports still image files, and common audio or video encoding formats. The function library further includes a surface manager (surface manager), which is mainly responsible for managing access to the display system, specifically for managing an interaction between display and an access operation when a plurality of application programs are executed, and is also responsible for display synthesis of a 2D drawing and a 3D drawing.

The function library layer may further include other function libraries for implementing various functions of the mobile phone, such as SGL (scalable graphics library), which is a 2D graphic image processing engine based on an XML (extensible markup language) file, and an SSL (secure sockets layer), which is located between a TCP/IP protocol and various application-layer protocols, and provides support for data communication.

Android Runtime is a running environment on the Android® operating system and is a new virtual machine used by the ANDROID® operating system. In the android Runtime, an AOT (ahead-of-time) technology is used; and when an application program is installed for the first time, a bytecode of the application program is pre-compiled into a machine code, so that the application program becomes a real local application, and the compilation step is omitted when the application program runs again later, thereby accelerating start-up and execution of the application program.

In some other embodiments of this application, android Runtime may be replaced by a core function library (core libraries) and a dalvik virtual machine (dalvik virtual machine). The core function library provides most of the functions in Java APIs, and mainly provides the application program framework layer with an interface for invoking an underlying program library by using a java native interface (java native interface, JNI). The core function library further includes some core APIs of the operating system, such as android.os, android.net, and android.media. The dalvik virtual machine uses a JIT (just-in-time) compilation mechanism. Each time a process is started, the virtual machine needs to recompile the bytecode in the background, which affects the startup speed on a certain degree. Each application program runs in an instance of a dalvik virtual machine, and each stance of the dalvik virtual machine is a separate process space. The dalvik virtual machine is designed so that a plurality of virtual machines can efficiently run on one device. A format of a file executable by the dalvik virtual machine is .dex, and the dex format is a compression format designed for dalvik and is suitable for systems with a limited memory space and a limited processor speed. It should be noted that the dalvik virtual machine provides basic functions (threads and underlying memory management) by relying on the linux kernel. It can be understood that android Runtime and dalvik belong to different types of virtual machines, and those skilled in the art can select different types of virtual machines in different situations.

4. Linux Kernel (Linux Kernel) Layer

This layer provides core system services for the operating system, such as security, memory management, process management, a network protocol stack, and a driver model, which are all based on the linux kernel. The linux kernel also serves as an abstraction layer between hardware and a software stack. This layer includes many drivers associated with the mobile device. The main drivers include a display driver; a linux-based frame buffer driver, a driver of a keyboard used as an input device, a flash driver based on a memory technology device, a camera driver, an audio driver, a Bluetooth driver, a Wi-Fi driver, and the like.

For ease of understanding, a method for displaying/ switching an input method virtual keyboard according to an embodiment of this application is described in detail below with reference to the accompanying drawings.

In some embodiments of this application, a scenario in which a user opens a user interface in an application (APP) is used as an example: A terminal receives a first operation performed by the user on a touchscreen for the APP; and in response to the first operation, the terminal may display a chat interface with a contact or group in the APP. Further, the terminal may obtain a first chat message on the chat interface. Then, based on a type of the first chat message, the terminal may determine a first virtual keyboard that corresponds to the type and that is provided by the input method APP, and display the first virtual keyboard on the chat interface, so that the first virtual keyboard is opened.

The foregoing application may be any application classified as a social type or a chat type in an application market, for example, an instant messaging application such as WeChat, QQ, or WhatsAPP. Alternatively, the foregoing application may be a native application program (such as short messaging) that is installed on the terminal and that is capable of sending and receiving information. Alternatively, the foregoing application may be an application (such as Alipay) that is classified as a tool type in the application market and that has a chat function.

Figure 6A:
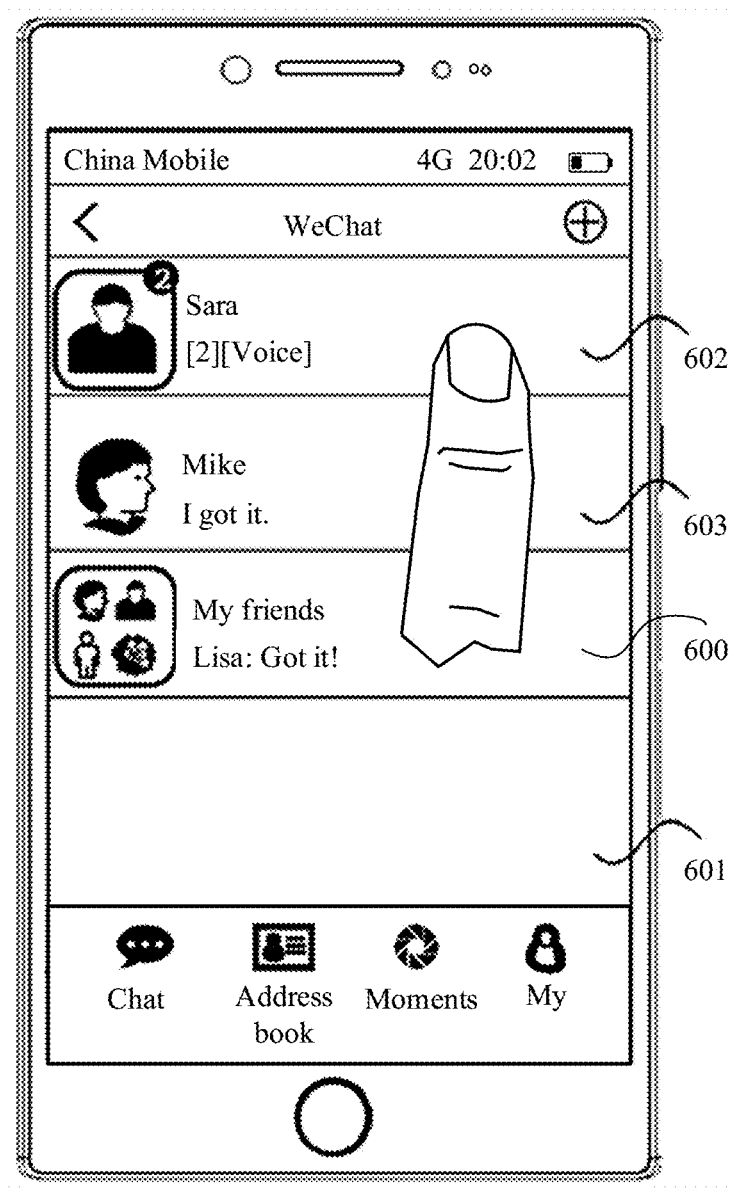
FIG. 6A and FIG. 6B are a second diagram of a series of scenarios where an input method virtual keyboard is displayed according to an embodiment of this application.

A detailed description is provided below by using WeChat as an example. A user interface 601 shown in FIG. 6A is a list of WeChat contact sessions. The user interface 601 may include chat items with one or more contacts of the user. Specifically, the display interface 601 shown in FIG. 6A includes a chat item 602 with Sara, a chat item 603 with Mike, and a chat item 600 of a WeChat group called "My friends" Each chat item may specifically include an avatar of a contact/group, a nickname, and content such as recent chat messages and time. In the chat item 602, a mark indicating two unread messages are displayed on the upper right corner of Sara's avatar.

Figure 6B:
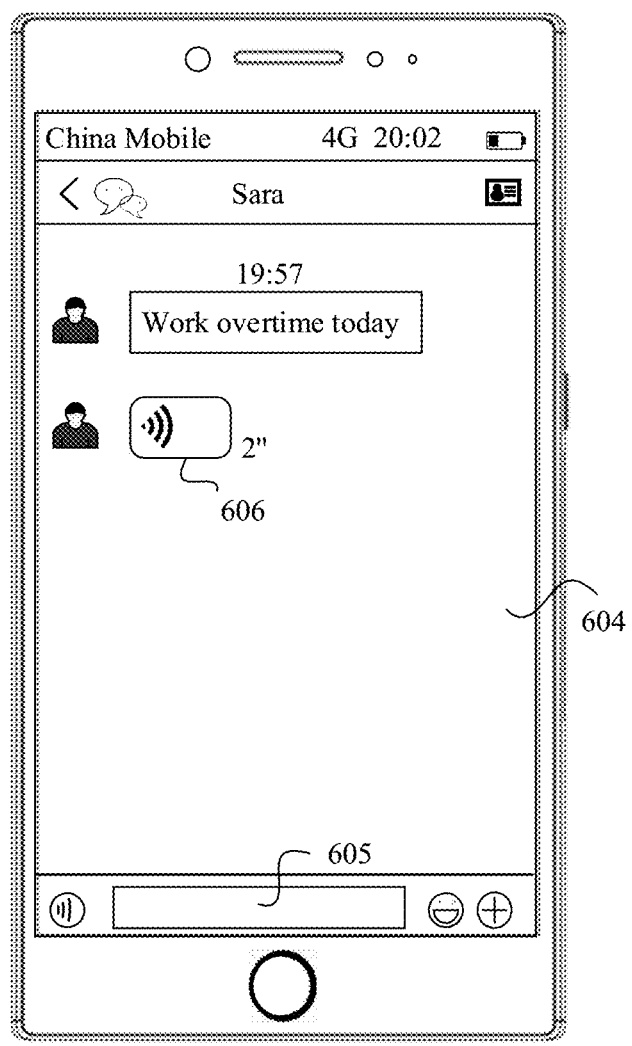

If the terminal detects a first operation performed by the user on the foregoing chat item 602, for example, an operation of clicking the chat item 602, it indicates that the user wants to enter the chat interface with the contact Sara. In this case, in response to the first operation, as shown in FIG. 6B, the terminal may display a chat interface 604 with Sara. Chat messages displayed on the chat interface 604 may include a chat message that the user has read, and may further include a chat message that the user has not read. In addition, the chat interface 604 may include an input box 605. The input box 605 is used to receive a chat message input by a user to Sara, where the chat message may be text, voice, a number, an image, an emoticon, or the like.

Generally, the user needs to input a chat message into the input box 605 using an input method APP installed on the terminal. For example, when the terminal detects that the user's finger clicks the input box 605, the terminal may report an input event corresponding to the click operation to WeChat, and then WeChat may invoke an input method manager by using a corresponding API, so as to request the input method manager to display a corresponding virtual keyboard provided by the input method APP on the touchscreen, so that the user may input a chat message into the input box 605 by using the virtual keyboard.

It should be noted that the scenarios shown in FIG. 6A and FIG. 6B are scenarios in which the user opens the chat interface with the contact Sara from the chat item 602 by using the chat item 602 as an entry. It can be understood that the user may also perform a first operation from another entry to open a chat interface with a contact. For example, the user may open a chat interface with a contact from a leftmost screen, a pull-up menu, a pull-down menu, or a lock screen interface. This is not limited in this embodiment of this application.

The leftmost screen is an interface that is displayed when a user slides from a home screen on a desktop to the right. The interface may display reminders such as functions and applications that are commonly used by the user, and subscribed services and information. A menu of the leftmost screen may also be referred to as a desktop assistant, a shortcut menu, or the like.

Figure 7:
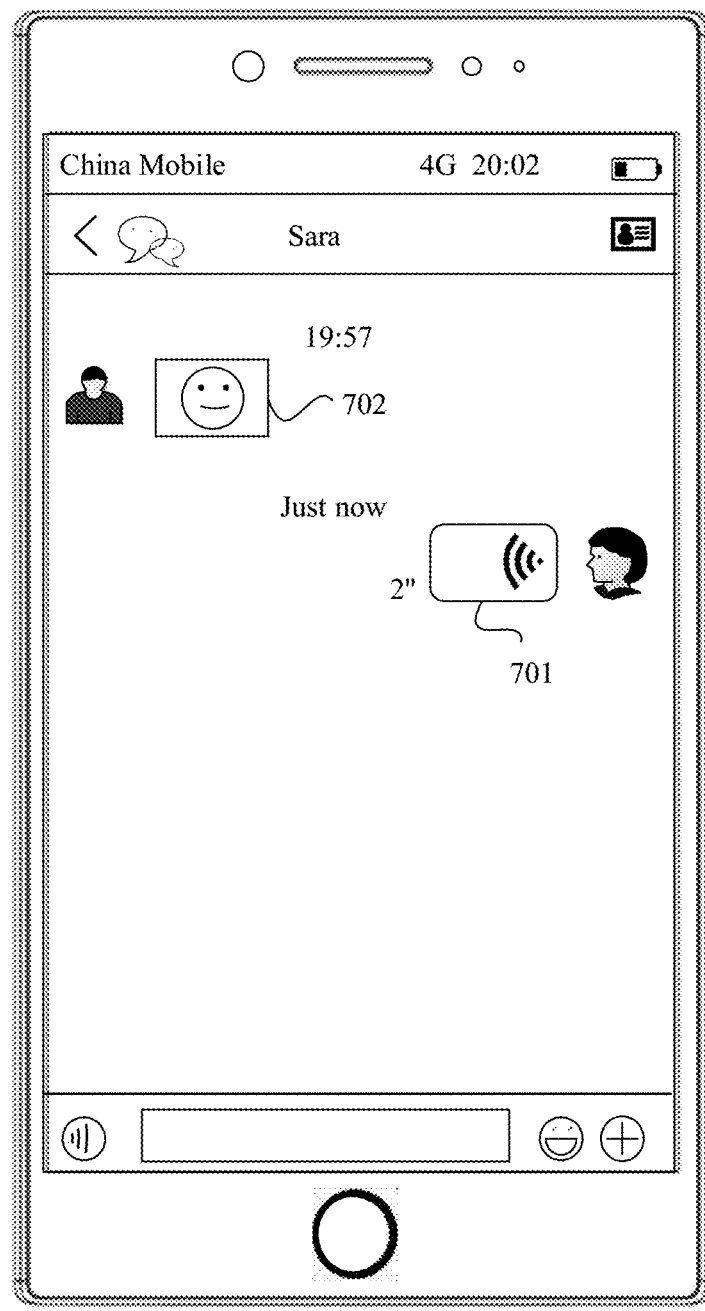
FIG. 7 is a third schematic diagram of a scenario where an input method virtual keyboard is displayed according to an embodiment of this application.

After the terminal displays the chat interface 604 with Sara, the terminal can obtain the first chat message on the chat interface. The first chat message may be the latest chat message on the chat interface. For example, the first chat message may be a voice message 701 just sent by a user on a chat interface shown in FIG. 7. Alternatively, the first chat message may be a chat message recently sent by a particular contact on the chat interface. For example, the first chat message may be an emoticon message 702 sent by Sara on the chat interface shown in FIG. 7. Alternatively, the first chat message may be a chat message recently sent by a particular contact when the user is chatting within the group. A chat message recently sent by a contact (for example, a contact A) refers to the latest message that is received by the user from the contact A.

In some embodiments of this application, the terminal may obtain the first chat message by using an optical character recognition (optical character recognition, OCR) technology. The OCR technology means that a terminal optically converts an image file that includes a text, an image, and other information into a black-and-white dot matrix for a printed character, and the information in the image file is further analyzed using identification software. A type of information (for example, text, voice, or image) contained in a file of an image type such as a screenshot can be identified using the OCR technology.

Still using WeChat as an example, when the chat interface 604 with Sara is displayed, the application program framework layer within the terminal may instruct the screenshot application at the application program layer to perform a screenshot operation. Further, the screenshot application at the application program layer can access a screenshot interface management service provided by the application program framework layer by using a related API, so as to take a screenshot of content displayed on the current chat interface 604. When the screenshot operation succeeds, the screenshot application at the application program layer may generate a screenshot. In addition, the terminal may display the generated screenshot and switch back to the chat interface 604 that is displayed when the screenshot operation is performed. Then, based on the screenshot of the chat interface 604, the terminal can identify each chat message included on the chat interface 604 by using the OCR technology. Further, the terminal may obtain, in chronological order, the latest chat message or the latest chat message sent by Sara on the chat interface 604. Still as shown in FIG.

6B, both the latest chat message on the chat interface 604 and the latest chat message sent by Sara are a voice message 606.

In some other embodiments of this application, the terminal may alternatively obtain the first chat message by obtaining buffered data of the current display frame. A displaying process of the terminal is a high-speed frame drawing process. For example, the terminal can draw each displayed frame at a frequency of 60 Hz. During the drawing of each displayed frame, a view (view) at the application program framework layer may buffer content of the currently displayed frame for a period of time. Then, after the terminal displays the chat interface 604 between the user and Sara, the application program framework layer may invoke the interface View decorView=activity.getWindow( )getDecorView( ) to obtain an entire window view of the chat interface 604, and invoke the interface decorView.getChild (i) to obtain each control included in the window view. Because each chat message on the chat interface 604 may be used as a control, the terminal may determine the first chat message on the chat interface 604 based on the order or location of each control obtained. Alternatively, because the input box 605 on the chat interface 604 is also a control, the terminal may also determine the control closest to the input box 605 as the first chat message on the chat interface 604.

In some other embodiments of this application, WeChat may alternatively open a specific interface to an operating system of the terminal (for example, the foregoing application program framework layer), so that the application program framework layer may obtain the first chat message on the chat interface 604 by invoking the interface provided by WeChat.

It can be understood that, in addition the foregoing method, the terminal may obtain the first chat message using another method, and the method for obtaining the first chat message by the terminal is not limited in this embodiment of this application.

In addition, the terminal may obtain the first chat message using the above method in different cases.

For example, after the terminal displays the chat interface 604 with Sara, if a second operation (such as a click operation) that is input by the user into the input box 605 on the chat interface 604 is received, it indicates that the user wants to input information into the input box 605 using the input method APP. In this case, in response to the second operation, the terminal may obtain the first chat message on the chat interface 604 using the foregoing method.

For another example, when the terminal displays a contact session list shown in FIG. 6A, if the contact session list includes an unread message, and it is detected that the user clicks the chat item 602 including an unread message, it generally indicates that the user wants to reply to the unread message. Therefore, after the terminal detects the click operation of the user for the chat item 602 in FIG. 6A, in response to the above click operation, the chat interface 604 may be opened, and the first chat message on the chat interface 604 may be obtained. Alternatively, because the contact session list shown in FIG. 6A further includes information such as a type of an unread message, the terminal may obtain the type of the first chat message in the chat item 602 when the contact session list shown in FIG. 6A is displayed.

For another example, after the terminal displays the chat interface 604 with Sara, if a new chat message is displayed on the chat interface 604, the latest chat message (namely, the first chat message) on the chat interface 604 will change accordingly. Therefore, the terminal may also obtain the first chat message on the chat interface 604 when a new chat message is displayed on the chat interface 604.

After the terminal obtains the first chat message on the chat interface, the terminal may determine a corresponding first virtual keyboard based on a type of the first chat message. For example, chat messages may be divided into a variety of message types such as a text message, a numeric message, a symbolic message, an emoticon message, and a voice message. Text messages may be divided into a plurality of types such as a Chinese message and an English message based on the language type; and emoticon messages may be divided into a plurality of types such as an emoji message, a kaomoji message, and an emoticon package.

Correspondingly, virtual keyboards provided by the input method APP may be divided into a plurality of types such as a text keyboard, a numeric keyboard, a symbol keyboard, an emoticon keyboard, and a voice keyboard. Text keyboards may include a plurality of types of keyboards such as a Chinese keyboard and an English keyboard; and emoticon keyboards include a plurality of types of keyboards such as an emoji keyboard, a kaomoji keyboard, and an emoticon keyboard.

In this embodiment of this application, the terminal may provide the user with a virtual keyboard of a corresponding type based on the type of the first chat message. For example, when the type of the first chat message is a voice type, the input method APP running on the terminal may determine the voice keyboard corresponding to the voice type as the first virtual keyboard. In this way, when the user opens the virtual keyboard, the terminal can automatically display a virtual keyboard matching the type of the chat message based on the latest chat message, thereby reducing operations of the user to frequently switch the virtual keyboard in the process of inputting information using the input method APP, and improving the input efficiency of the terminal and the input experience of the user.

For example, the terminal may set a content sensor service open to the input method APP at the application program framework layer, and the input method APP may obtain the first chat message determined by the terminal by invoking the content sensor service. Certainly, the content sensor service may also send the obtained first chat message to the input method APP. Further, the input method APP may determine the type of the first chat message based on a format or a control type of the first chat message. For example, when the first chat message is a control of a text view type, it can be determined that the first chat message is of a text type; or when the first chat message is a control of an image view type, it can be determined that the first chat message is of an image type. Certainly, alternatively, the type of the first chat message may be first determined by the content sensor service, and then the input method APP may obtain the type of the first chat message by invoking the content sensor service.

Because the chat mode between the user and the contact has continuity and unity for a period of time, after the input method APP obtains the type of the first chat message, the virtual keyboard corresponding to the type of the first chat message among the plurality of virtual keyboards supported by the input method APP can be determined as the first virtual keyboard. For example, when the type of the first chat message is Chinese text, a virtual keyboard corresponding to the first chat message may be a pinyin keyboard of a nine-grid type or a pinyin keyboard of a full-keyboard type; when the type of the first chat message is a numeric type, a virtual keyboard corresponding to the first chat message may be a numeric keyboard; when the type of the first chat message is a voice type, a virtual keyboard corresponding to the first chat message may be a voice keyboard; or when the type of the first chat message is an emoticon type, a virtual keyboard corresponding to the first chat message may be an emoticon keyboard. When a plurality of emoticon keyboards are supported by the input method APP, the terminal may determine, based on the specific emoticon type of the first chat message, that the virtual keyboard corresponding to the virtual keyboard is an emoji keyboard, a kaomoji keyboard, or an emoticon package keyboard.

In some other embodiments of this application, if a time interval between the receiving time of the first chat message and the current time is greater than a predetermined time, the terminal may determine a default virtual keyboard as the first virtual keyboard. For example, if the first chat message is sent to the user three hours ago and the predetermined time is two hours, it indicates that the current input scenario may have changed. Therefore, the terminal may no longer determine the first virtual keyboard to be displayed subsequently based on the type of the first chat message, but determines the default virtual keyboard as the first virtual keyboard. The default virtual keyboard may be a virtual keyboard that is most frequently used by the user, or the default virtual keyboard may be a virtual keyboard that is recently used by the user. This is not limited in this embodiment of this application.

Figure 8A:
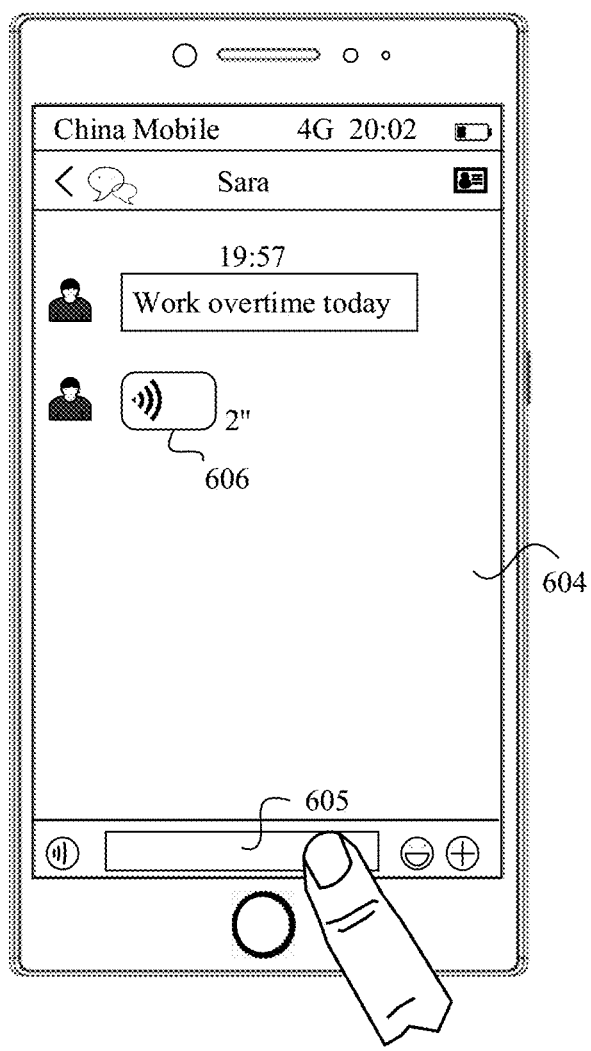
FIG. 8A and FIG. 8B are a fourth schematic diagram of a series of scenarios where a display input method virtual keyboard is displayed according to an embodiment of this application.
Figure 8B:
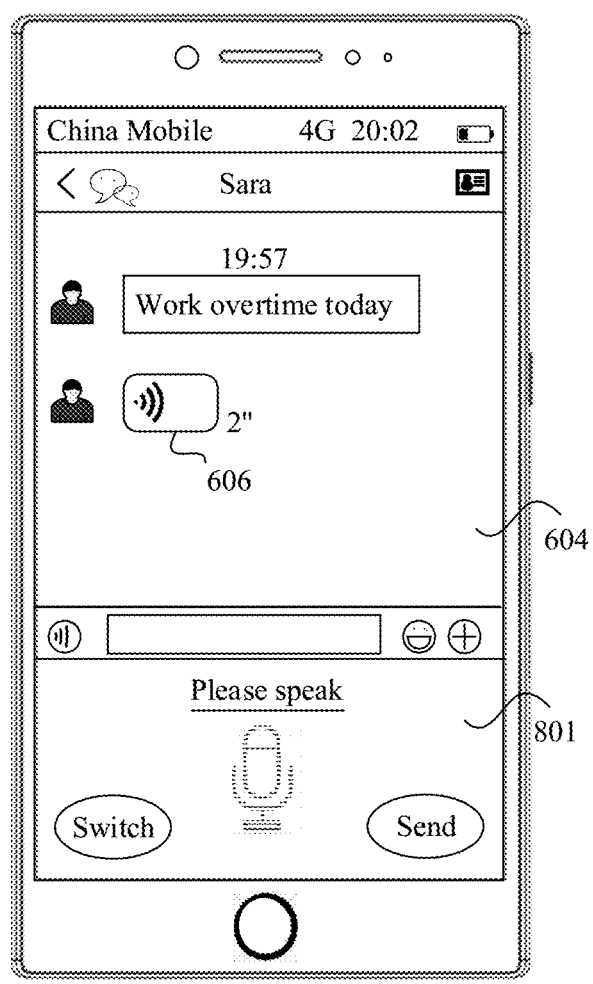

As shown in FIG. 8A, if the terminal detects the user inputs a second operation, such as a click operation, into the input box 605 on the chat interface 604, the terminal reports a corresponding input event to WeChat, and WeChat may invoke the input method manager at the application program framework layer, so as to request the input method APP to open the first virtual keyboard determined by the input method APP on the chat interface. In this case, as shown in FIG. 8B, the terminal may display a voice keyboard 801 corresponding to a first chat message 606 of a voice type on the chat interface 604. That is, based on the type of the first chat message, the terminal can determine and display the type of the virtual keyboard required by the user in the input process, so that the virtual keyboard corresponding to the type of the first chat message can be displayed when the virtual keyboard is opened, and the user does not need to perform switching for a plurality of times to find the virtual keyboard required after the virtual keyboard is opened.

Figure 9A:
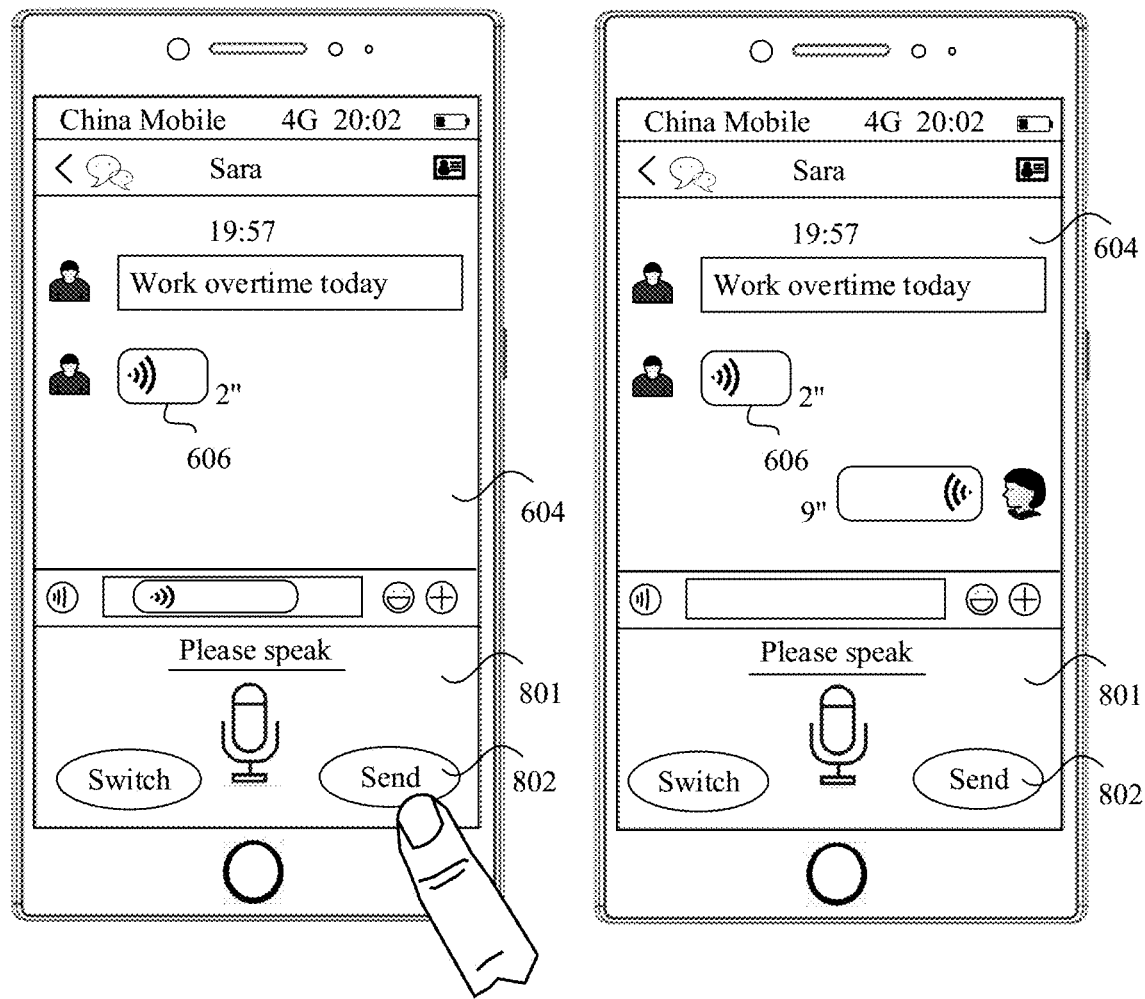
FIG. 9A to FIG. 9C are a fifth schematic diagram of a series of scenarios where an input method virtual keyboard is displayed according to an embodiment of this application.

After the terminal displays the voice keyboard 801 on the chat interface 604, the input method APP may start to detect received audio information. Further, as shown in FIG. 9A, the input method APP may input obtained audio information into the input box 605 in a form of voice; and when it is detected that the user clicks a sending button 802 on the voice keyboard 801, WeChat may send the obtained audio information to Sara in a form of voice. That is, if the message input by the user by using the voice keyboard 801 is a voice message, the message input by the input method APP into the input box 605 and the message sent by WeChat to the contact are also voice messages, thereby ensuring consistency between the types of the input messages.

Figure 9B:
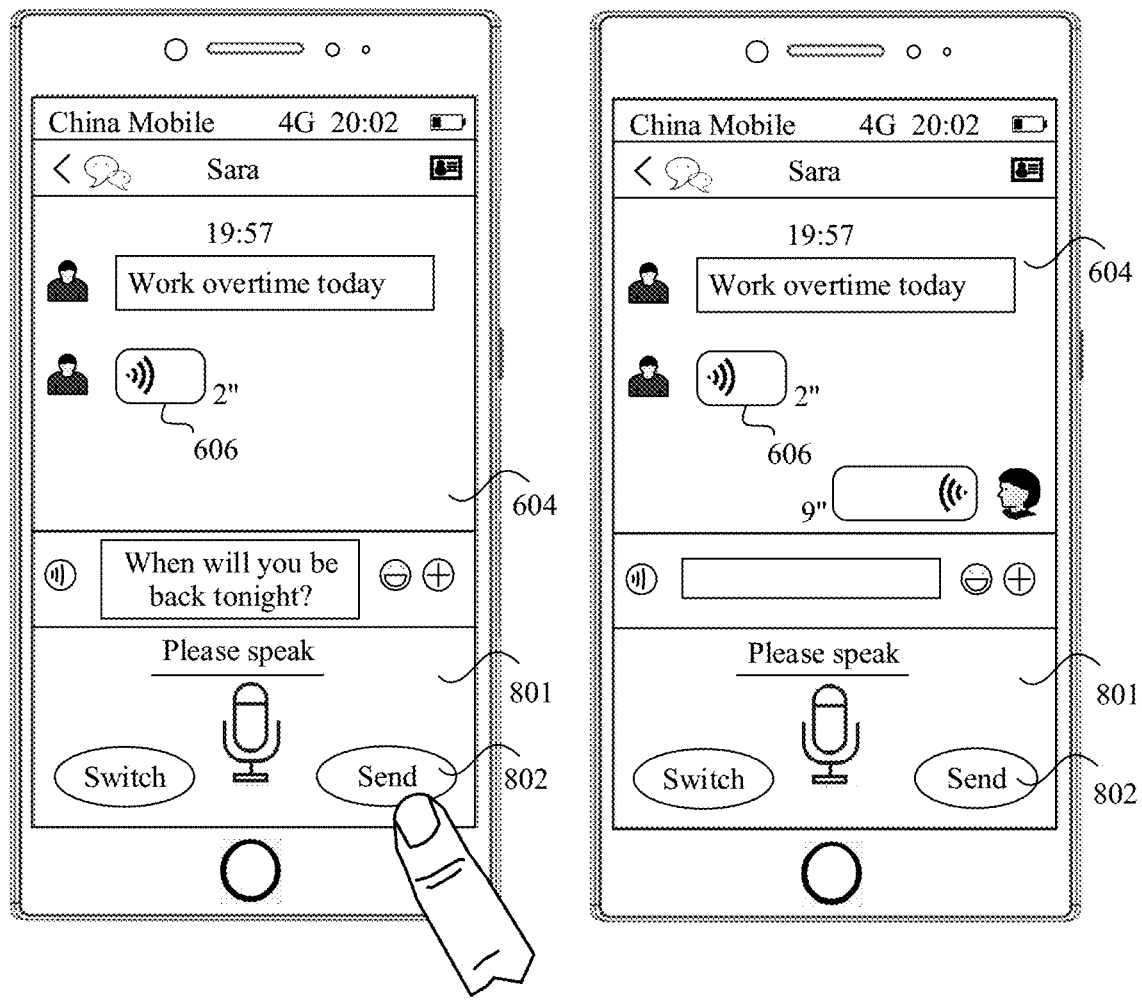

For another example, as shown in FIG. 9B, the input method APP may input the collected audio information into the input box 605 in a form of text, so that the user can visually determine whether the audio information collected by the input method APP is accurate. In addition, after detecting that the user clicks the sending button 802 on the voice keyboard 801, WeChat may still send the collected audio information to Sara in a form of voice, thereby ensuring that a message type of a message input by the user is the same as a message type of a message received by the contact.

Figure 9C:
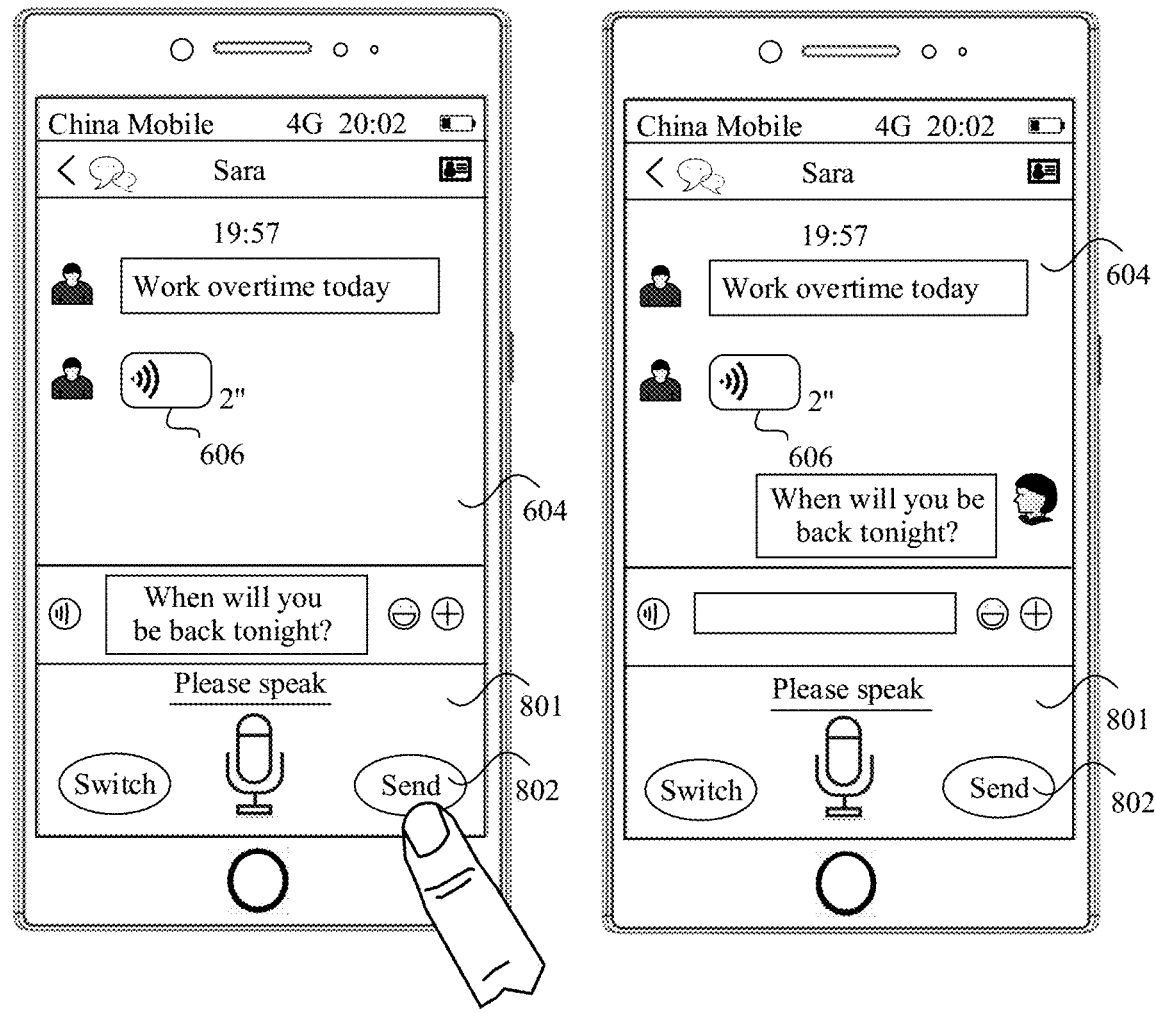

For another example, as shown in FIG. 9C, the input method APP may input collected audio information into the input box 605 in a form of text; and when it is detected that the user clicks the sending button 802 on the voice keyboard 801, WeChat may send text in the input box to Sara to ensure that a message type of an input message in the input box 605 is the same as a message type of a message received by the contact.

Certainly, the input method APP may alternatively send the collected audio information (or a text form of the audio information) to a contact directly through WeChat server by invoking a software development kit (software development kit, SDK) provided by WeChat. In this case, the voice information input by the user by using the voice keyboard 801 can be displayed on the chat interface 604 without entering the input box 605.

It should be noted that the terminal may receive the second operation input by the user into the input box 605 before the terminal obtains the first chat message on the chat interface or before the terminal determines the first virtual keyboard. This is not limited in this embodiment of this application. For example, when the terminal detects that the user inputs a second operation into the input box 605, in response to the second operation, the terminal may obtain the first chat message on the chat interface by using the method in the foregoing embodiment, and display the first virtual keyboard on the chat interface based on the type of the first chat message.

Each of the foregoing embodiments is described based on an example in which the type of the first chat message on the chat interface is a voice type. In some embodiments of this application, the first chat message may alternatively be a chat message of an emoticon type.

Figure 10A:
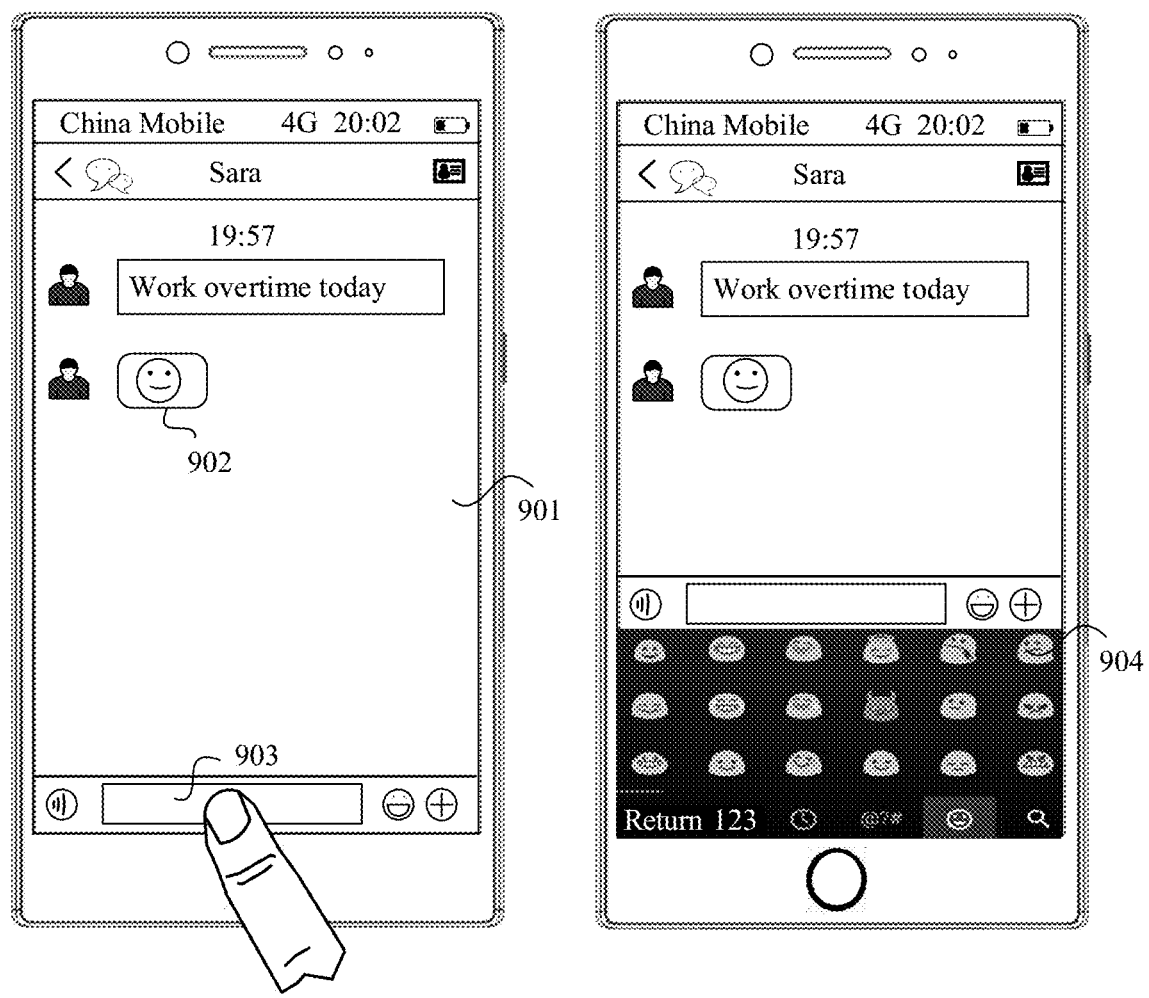
FIG. 10A to FIG. 10C are a sixth schematic diagram of a series of scenarios where an input method virtual keyboard is displayed according to an embodiment of this application.

As shown in FIG. 10A, if the first chat message obtained by the terminal from a chat interface 901 is an emoji message 902 sent by Sara, the terminal may display an emoji keyboard 904 corresponding to the emoji message 902 on the chat interface 901 in response to a second operation input by the user into an input box 903.

Figure 10B:
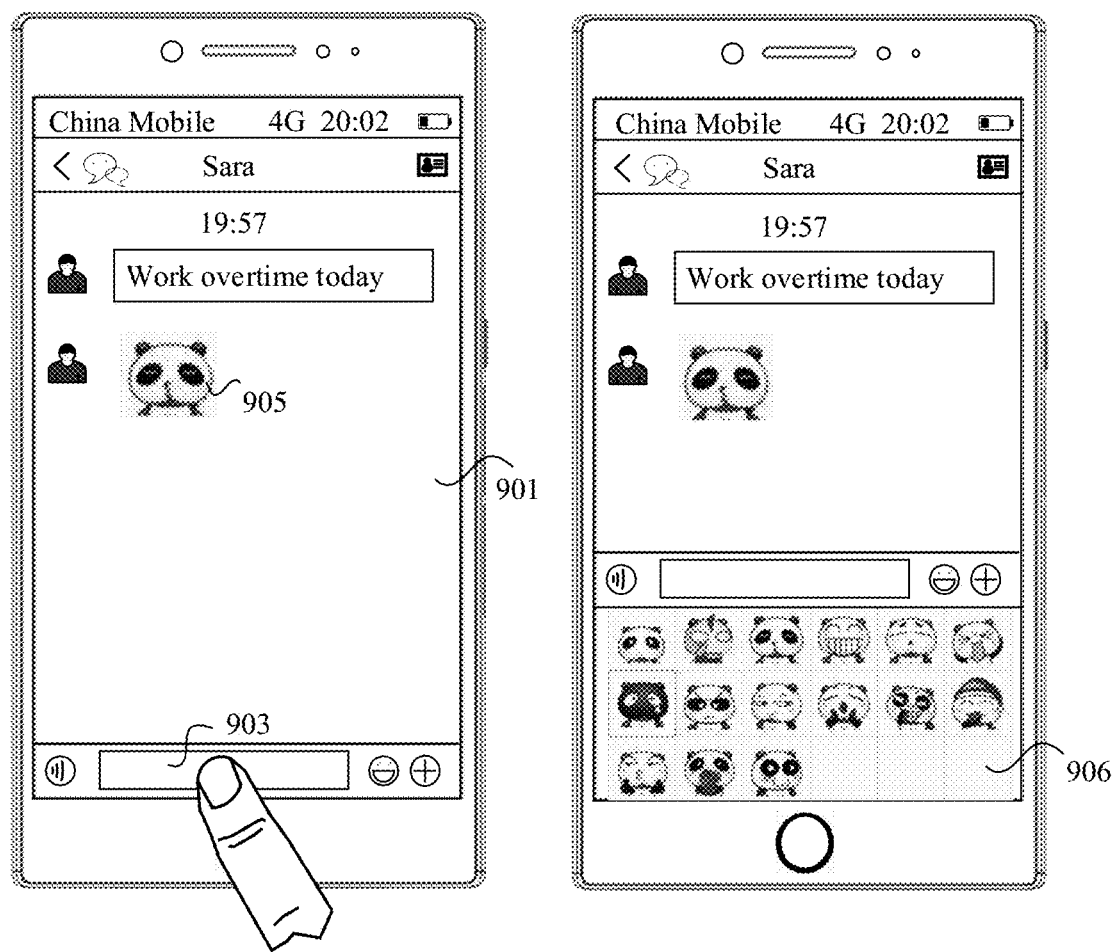

Alternatively, as shown in FIG. 10B, if the first chat message obtained by the terminal from the chat interface 901 is an emoticon package message 905 sent by Sara, the terminal may display an emoticon package keyboard 906 corresponding to the emoticon package message 905 on the chat interface 901 in response to the second operation input by the user into the input box 903.

Figure 10C:
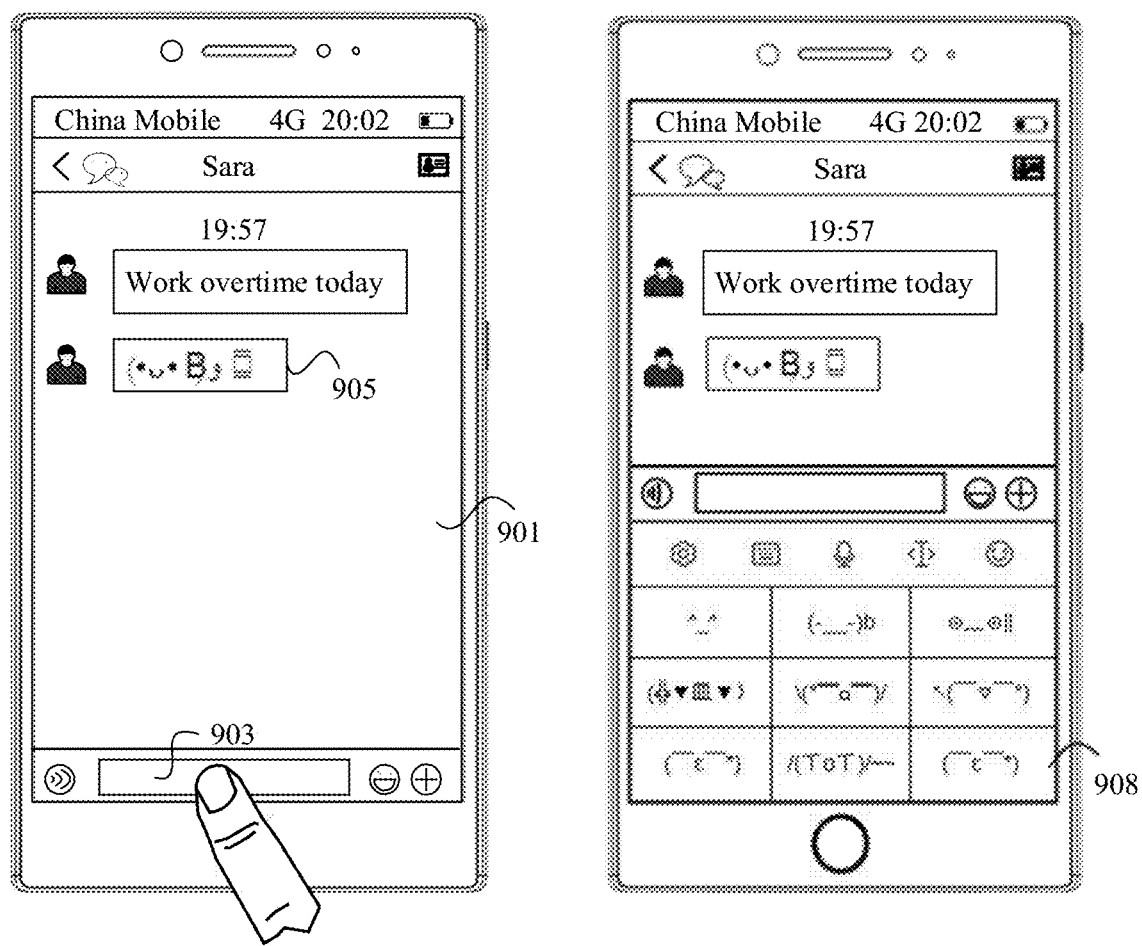

Alternatively, as shown in FIG. 10C, if the first chat message obtained by the terminal from the chat interface 901 is a kaomoji message 907 sent by Sara, the terminal may display a kaomoji keyboard 908 corresponding to the kaomoji message 907 on the chat interface 901 in response to the second operation input by the user into the input box 903.

In some other embodiments of this application, the first chat message may alternatively be a chat message of a text type.

Figure 11A:
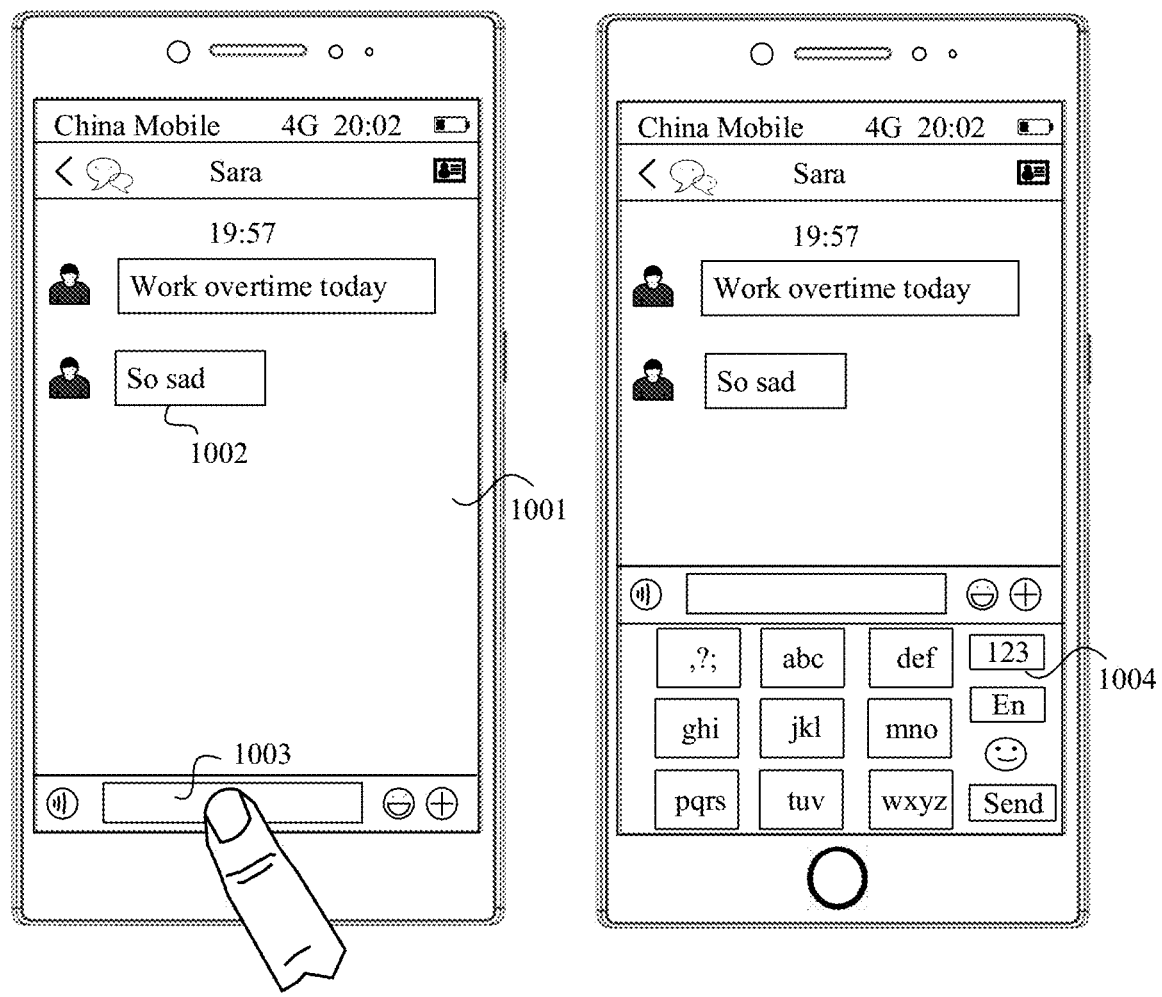
FIG. 11A and FIG. 11B are a seventh schematic diagram of a series of scenarios where an input method virtual keyboard is displayed according to an embodiment of this application.

As shown in FIG. 11A, if the first chat message obtained by the terminal from a chat interface 1001 is a Chinese text message 1002 sent by Sara, the terminal may display a pinyin keyboard 1004 corresponding to the Chinese text message 1002 on the chat interface 1001 in response to a second operation input by the user into an input box 1003. If the input method APP supports a plurality of Chinese input keyboards, such as a stroke input keyboard, a handwriting input keyboard, a nine-grid pinyin keyboard, a full-keyboard pinyin keyboard, and a five-stroke input keyboard, the input method APP may display the Chinese input keyboard most frequently used by the user on the chat interface 1001, or may display the Chinese input keyboard recently used by the user on the chat interface 1001.

Figure 11B:
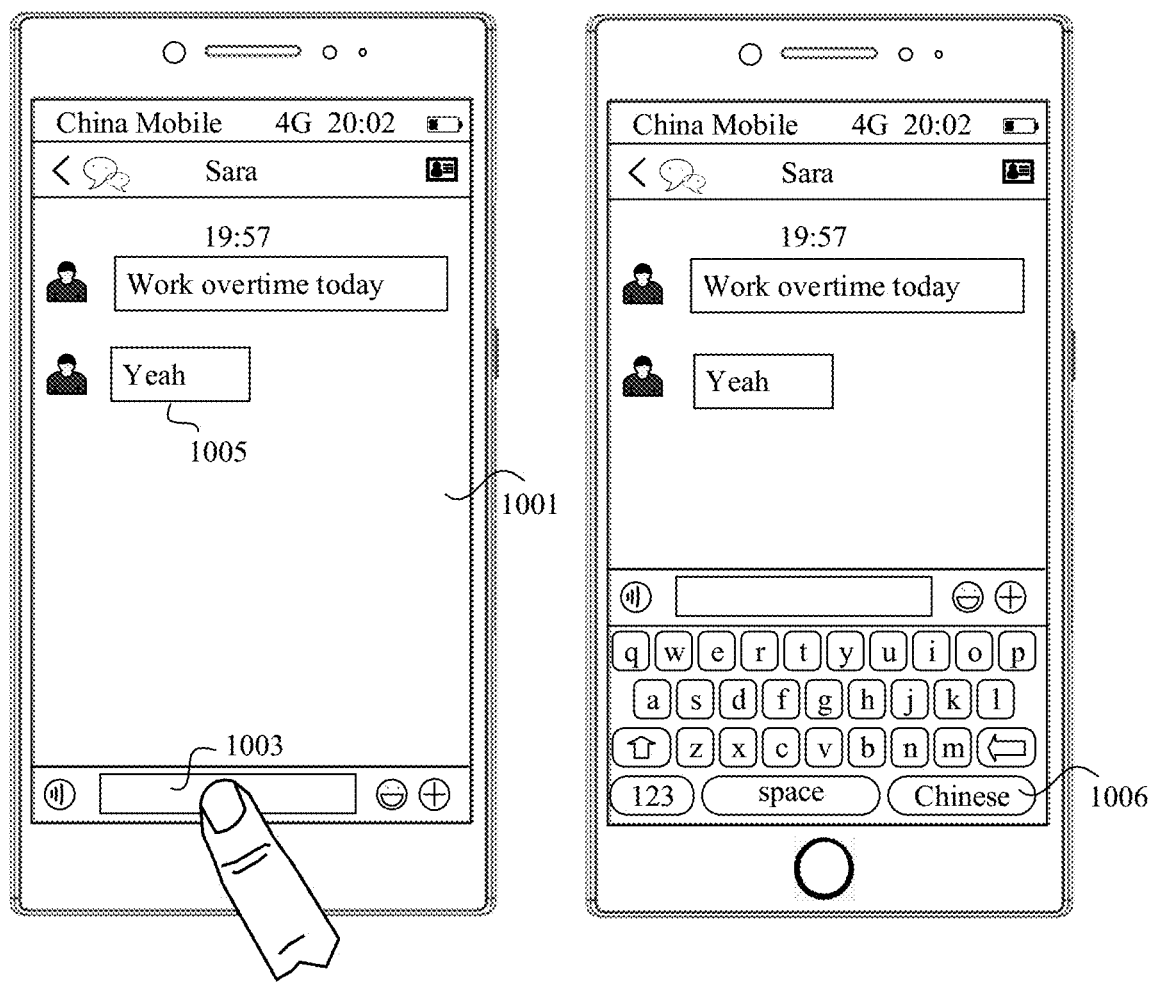

Alternatively, as shown in FIG. 11B, if the first chat message obtained by the terminal from the chat interface 1001 is an English (or another language) text message 1005 sent by Sara, the terminal may display an English (or another language) keyboard 1006 corresponding to the text message 1005 of the English (or another language) on the chat interface 1001 in response to the second operation input by the user into the input box 1003.

Figure 12:
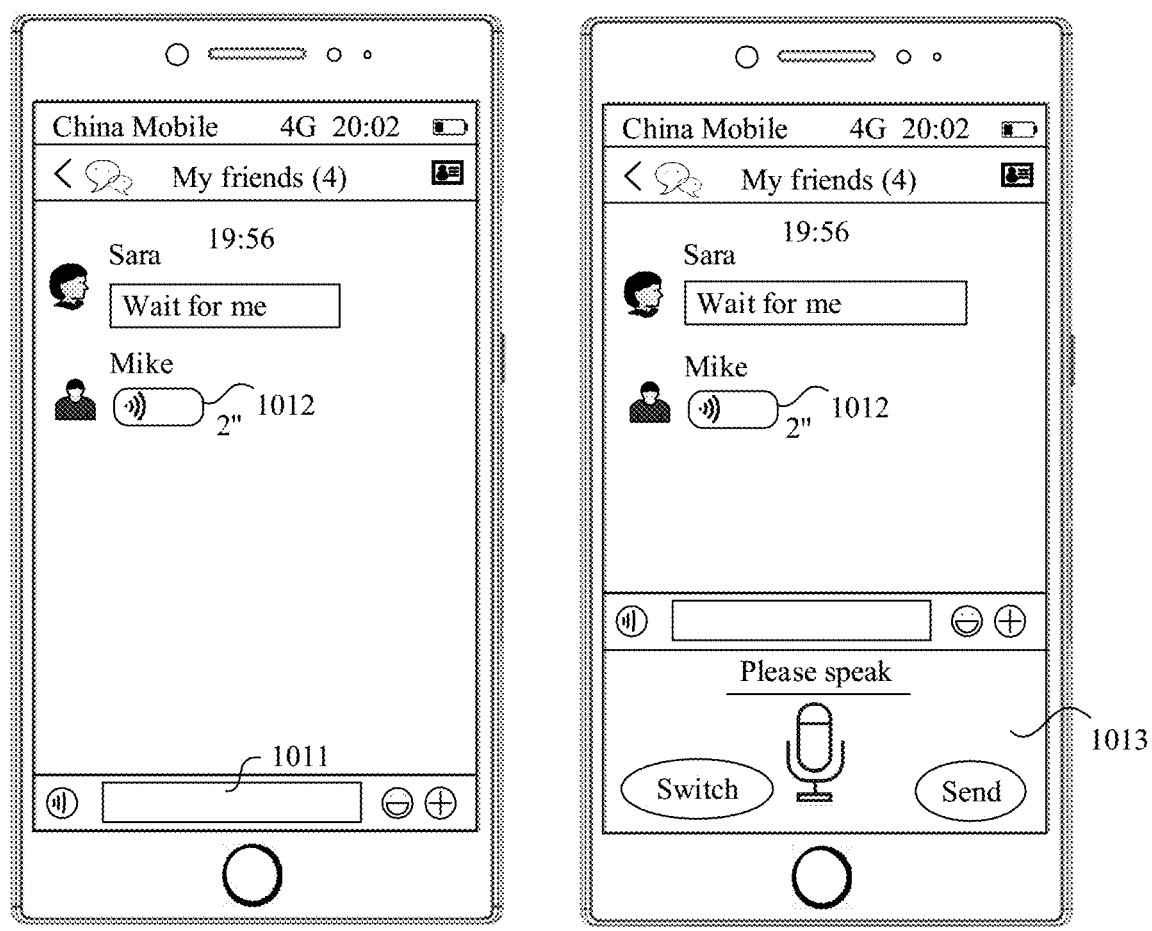
FIG. 12 is an eighth schematic diagram of a scenario where an input method virtual keyboard is displayed according to an embodiment of this application.

In some other embodiments of this application, the first chat message may alternatively the latest chat message in a group. For example, as shown in FIG. 12, a group named "My friends" includes four contacts. After the user opens a chat interface of the group "My friends", if the terminal detects that the user inputs a second operation into the input box 1011, the terminal may determine that the latest chat message on the chat interface is a voice message 1012, and then the terminal may display a voice keyboard 1013 corresponding to the voice message 1012 on the chat interface.

It can be learned that in this embodiment of this application, when the user opens the virtual keyboard of the input method on the chat interface, the terminal may display the virtual keyboard corresponding to the type of the latest chat message on the chat interface. In this way, when the virtual keyboard of the input method APP is opened, the terminal can automatically provide the user with the virtual keyboard matching the current chat input mode, thereby preventing the user from switching the virtual keyboard for a plurality of times.

In some other embodiments of this application, after the terminal displays the first virtual keyboard corresponding to the type of the first chat message on the chat interface, the user may input a chat message into the input box by using the first virtual keyboard, and send the chat message to a contact. In this case, a new chat message is generated on the chat interface between the user and the contact. Certainly, the new chat message may alternatively be a new message sent by the contact to the user. This is not limited in this embodiment of this application.

When a new chat message is generated on the chat interface, the terminal may obtain a new second chat message generated on the chat interface. Further, based on a type of the second chat message, the terminal determines a second virtual keyboard provided by the input method APP corresponding to the type of the second chat message. In this way, the terminal can switch from the first virtual keyboard currently displayed to the second virtual keyboard on the chat interface, thereby implementing automatic switching between different virtual keyboards in the chat process.

The second chat message may refer to the latest chat message among the newly generated chat messages on the chat interface, or the second chat message may refer to a chat message recently sent by a contact among the newly generated chat messages on the chat interface. For a related method for obtaining the second chat message by the terminal, reference may be made to the specific method for obtaining the first chat message by the terminal in the foregoing embodiment. Therefore, details are not described herein again.

Figure 13:
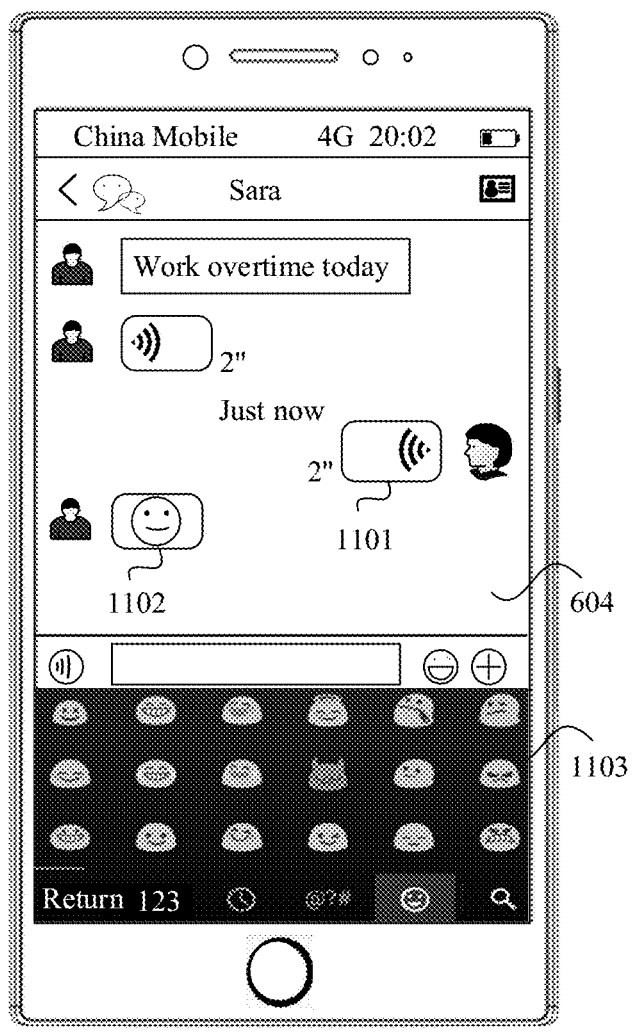
FIG. 13 is a first schematic diagram of a scenario where an input method virtual keyboard is switched according to an embodiment of this application.

For example, as shown in FIG. 13, newly generated chat messages on the chat interface 604 includes a chat message 1101 and a chat message 1102. The chat message 1102 is a chat message (namely, a second chat message) that is recently sent by Sara to the user. When the chat message 1102 is a chat message of an emoticon type, the terminal may determine an emoticon keyboard corresponding to the emoticon type as the second virtual keyboard.

Then, still as shown in FIG. 13, the terminal can automatically switch from the voice keyboard 801 originally displayed in FIG. 8B to an emoticon keyboard 1103 corresponding to the second chat message on the chat interface 604. In this way, the user and the contact can automatically switch the type of the virtual keyboard on the chat interface based on the type of the latest chat message on the chat interface, so that the user can chat with the contact by using the same input method, and the user does not need to switch the virtual keyboard for a plurality of times.

Certainly, if the newly generated second chat message on the chat interface is different from the type of the first chat message, when the terminal detects that the user is using the first virtual keyboard (for example, the voice keyboard 801) corresponding to the type of the first chat message, the terminal may continue to display the voice keyboard 801, or the terminal may automatically switch from the voice keyboard 801 to the emoticon keyboard 1103 after detecting that the user's finger leaves the voice keyboard 801. This does not disturb the normal input process of the user during the switching of the virtual keyboard.

In some embodiments of this application, when the terminal displays a chat interface with a contact or a group, the user may also perform a corresponding operation to instruct a related contact to view a chat message sent by the user. For example, when the user inputs a specific character (for example, "@" or "#") into the input box on the chat interface, the terminal may be triggered to display a contact list for the user to select one or more contacts. When the user selects one or more contacts, the user may send a chat message including the foregoing specific character. In this case, the terminal/terminals of the contact/contacts selected by the user may instruct the contact/contacts to view the chat message. For example, the terminal may display a prompt message "someone in the group mentions you, please view the message".

Figure 14A:
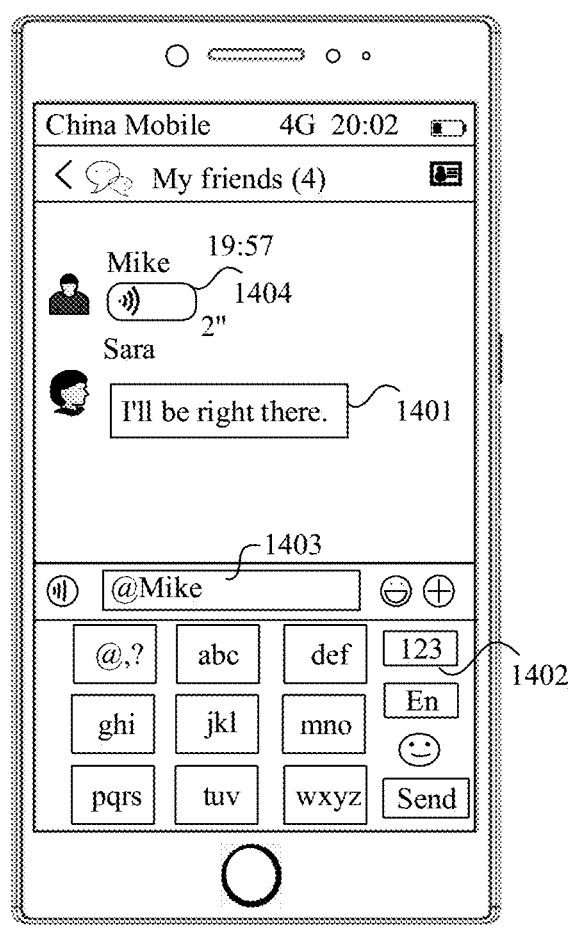
FIG. 14A and FIG. 14B are a second schematic diagram of a series of scenarios where an input method virtual keyboard is switched according to an embodiment of this application.
Figure 14B:
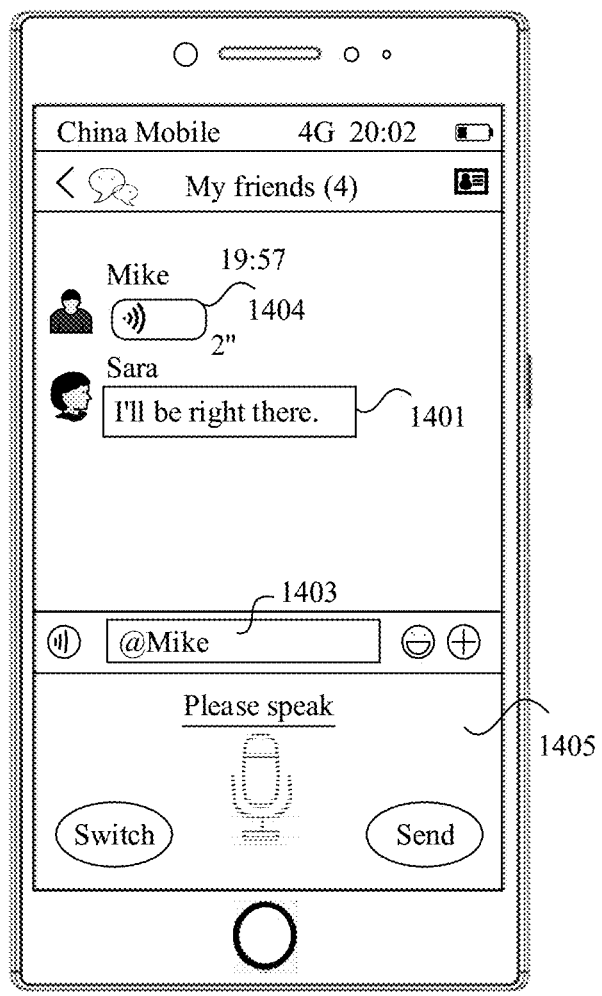

As shown in FIG. 14A, the user chats with a contact in the group "My friends" on the chat interface, and the terminal may automatically display, based on a type of the latest chat message (for example, a Chinese text message 1401) on the chat interface, a Chinese keyboard 1402 corresponding to the Chinese text message 1401 on the chat interface. If an operation of holding down or heavily pressing an avatar of a contact (for example, Mike) by the user's finger is detected, the terminal may automatically input "@Mike" into an input box 1403. In this case, it means that the user wants to talk to Mike, and then the terminal may query a type of the latest chat message that is received from Mike. As shown in FIG. 14B, the latest message received from Mike is a voice message 1404. Further, the terminal can automatically switch from the Chinese keyboard 1402 to a voice keyboard 1405 corresponding to the voice message 1404 on the chat interface. Therefore, in a multi-person chat scenario, the terminal can automatically switch to the virtual keyboard corresponding to the type of the chat message for a user based on a chat message of a contact, thereby reducing the quantity of times the user manually switches the keyboard in the multi-person chat scenario.

For another example, when the terminal detects that "@Mike" is input into the input box 1403, the terminal may also switch from the current virtual keyboard to the virtual keyboard used in the latest conversation with Mike, thereby improving the input efficiency when the user chats with Mike.

Certainly, the user may alternatively manually switch the virtual keyboard currently displayed when inputting "@Mike" into the input box 1403. This is not limited in this embodiment.

In addition, if the user talks with a plurality of contacts in the input box 1403 by using "@", for example, the user inputs "@Mike" and "@Sara" into the input box 1403, the terminal may select one contact from the plurality of contacts, for example, select the most recent contact, or contact the most frequent contact (for example, Sara), and then display the virtual keyboard corresponding to the type of the message based on the type of the message recently received from Sara.

In addition, in the foregoing embodiments, different types of virtual keyboards of the same input method APP are used as an example. It can be understood that a plurality of input method APPs may be installed on the terminal. Then, when determining a virtual keyboard corresponding to the type of the first chat message (or the second chat message), the terminal may also select the virtual keyboard among the virtual keyboards provided by the plurality of input method APPs, so that the terminal can automatically switch between the plurality of input method APPs based on the type of the chat message.

Figure 15A:
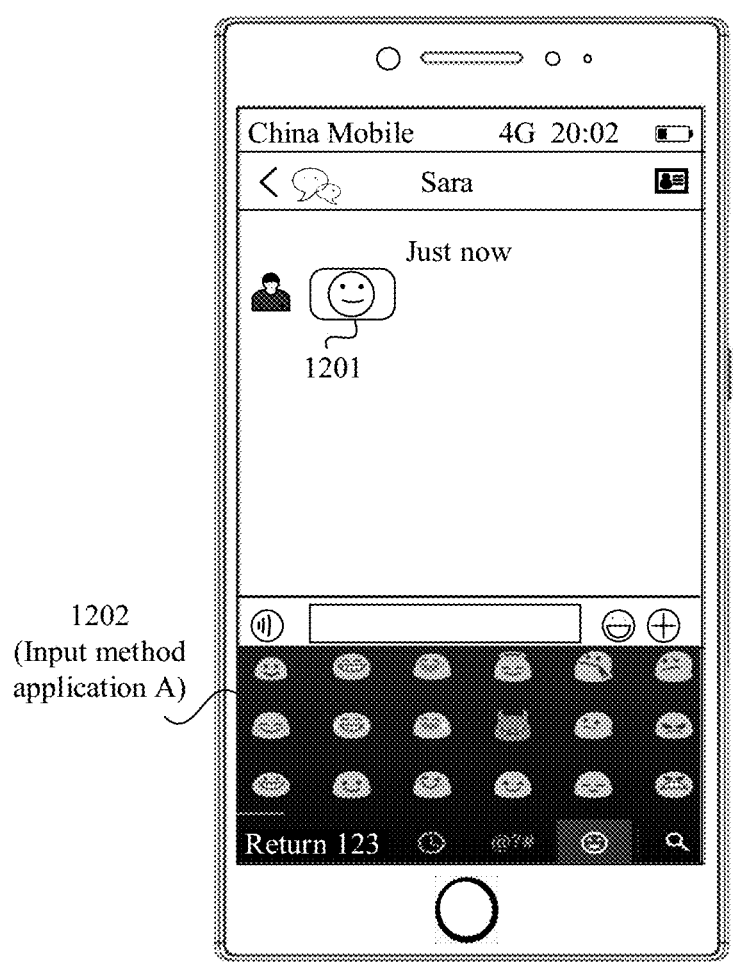
FIG. 15A and FIG. 15B are a third schematic diagram of a series of scenarios where an input method virtual keyboard is switched according to an embodiment of this application.

For example, an input method APPA and an input method APPB are installed on the terminal. As shown in FIG. 15A, the first chat message obtained by the terminal is an emoticon message 1201 sent by Sara in WeChat. Then, if both the input method APPA and the input method APPB are provided with an emoticon keyboard corresponding to an emoticon message, the terminal may display the emoticon keyboard used by the user last time in WeChat, or the emoticon keyboard used most frequently in WeChat (for example, an emoticon keyboard 1202 provided by the input method APPA) on the chat interface with Sara.

Figure 15B:
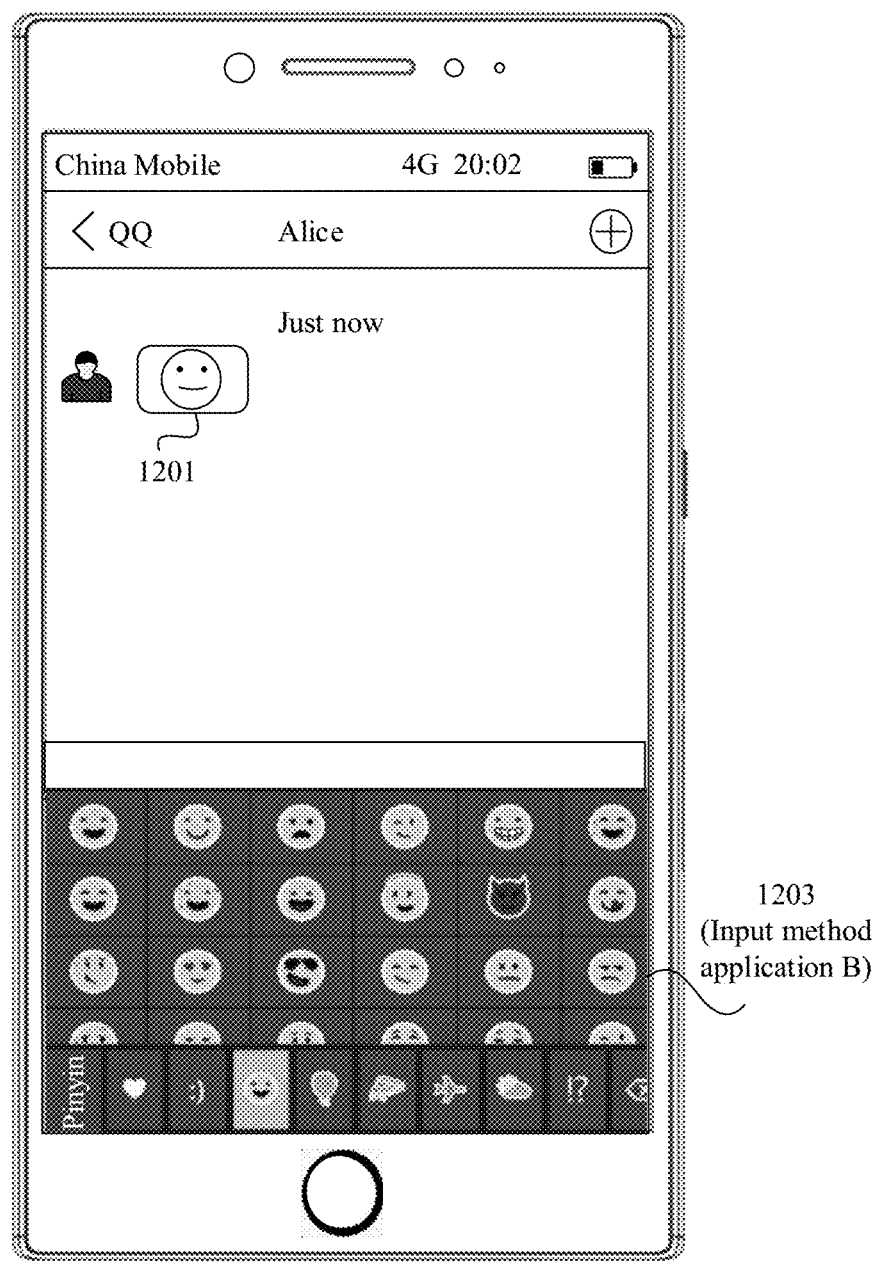

For another example, as shown in FIG. 15B, the first chat message obtained by the terminal is an emoticon message 1201 sent by Alice in QQ. Then, if both the input method APPA and the input method APPB are provided with an emoticon keyboard corresponding to an emoticon message, the terminal may display the emoticon keyboard used by the user last time in QQ, or the emoticon keyboard used most frequently in QQ (for example, the emoticon keyboard 1203 provided by the input method APPB) on a chat interface with Alice.

It can be learned that although the first chat message obtained by the terminal is a chat message of an emoticon type, the user has different preferences when using emoticon keyboards provided by different input method APPs in different applications. Therefore, in this embodiment of this application, when displaying a virtual keyboard, the terminal may display a virtual keyboard of the same type provided by different input method APPs to the user in different applications based on the use preferences of the user, thereby improving input efficiency of the terminal and input experience of the user.

In some other embodiments of this application, the terminal may also analyze the frequency at which each type of virtual keyboard is used by a user when different applications are running. For example, when the terminal runs a game application A, the terminal may analyze the frequency at which each of voice keyboard, the emoticon keyboard, the pinyin keyboard, and the numeric keyboard is used by the user for input. For example, if the terminal detects that the user invokes the voice keyboard for input for five consecutive times within a predetermined time, it indicates that the user is relatively accustomed to using the voice keyboard for input in the application scenario of the game application A, and therefore the terminal can record a correspondence between the game application A and the voice keyboard. In this way, if it is detected that the user performs the operation of opening the virtual keyboard during the operation of the game application A by the terminal, the terminal may display the voice keyboard based on the recorded correspondence. In this way, when the user uses a virtual keyboard in different applications, the terminal can display the virtual keyboard based on the frequency at which different types of virtual keyboards are used by user, and the virtual keyboard meets the usage habit of the user.

Further, still using the game application A as an example, because the user's use of the virtual keyboard in the game application A can largely reflect the user's use of the virtual keyboard in most game applications. Therefore, after determining the correspondence between the game application A and the voice keyboard, the terminal may further establish a correspondence between each game application installed on the terminal and the voice keyboard. In this way, when a game application B is running on the terminal, if the terminal detects that the user has performed an operation of opening the virtual keyboard, the terminal may also display a corresponding voice keyboard, so that the user can use the virtual keyboard based on the usage habit of the user for input in the game scenario.

Alternatively, when displaying the virtual keyboard of the input method application, the terminal may analyze the frequency at which a specific virtual keyboard is used, thereby determining an application scenario in which the virtual keyboard is used at a relatively high frequency. Using an animoji (animation emoji) keyboard as an example, the terminal may record a name of an application package that invokes the animoji keyboard each time the animoji keyboard is displayed. Further, the terminal may identify, through analysis, an application (for example, the WeChat application) that most frequently uses the animoji keyboard. Therefore, when the WeChat application is running on the terminal, if the terminal detects that the user performs the operation of opening the virtual keyboard, the terminal may display the corresponding animoji keyboard. Alternatively, the terminal may further identify, through analysis, a contact with whom the user most frequently uses animoji keyboard for chatting. In this way, if the terminal subsequently detects that the user performs an operation of opening the virtual keyboard on a session interface of the contact, the terminal may display the corresponding animoji keyboard, so that when displaying the virtual keyboard, the terminal may provide the user with the virtual keyboard meeting the usage habit of the user in different application scenarios based on the usage preferences of the user for the different virtual keyboards.

In addition, in the foregoing embodiment, the specific method for displaying the virtual keyboard by the terminal is described by using a chat scenario as an example. It can be understood that the method for displaying the virtual keyboard may be applied to a social scenario in which a virtual keyboard is required for input, such as replying, forwarding, or commenting. This is not limited in this embodiment of this application.

Figure 16:
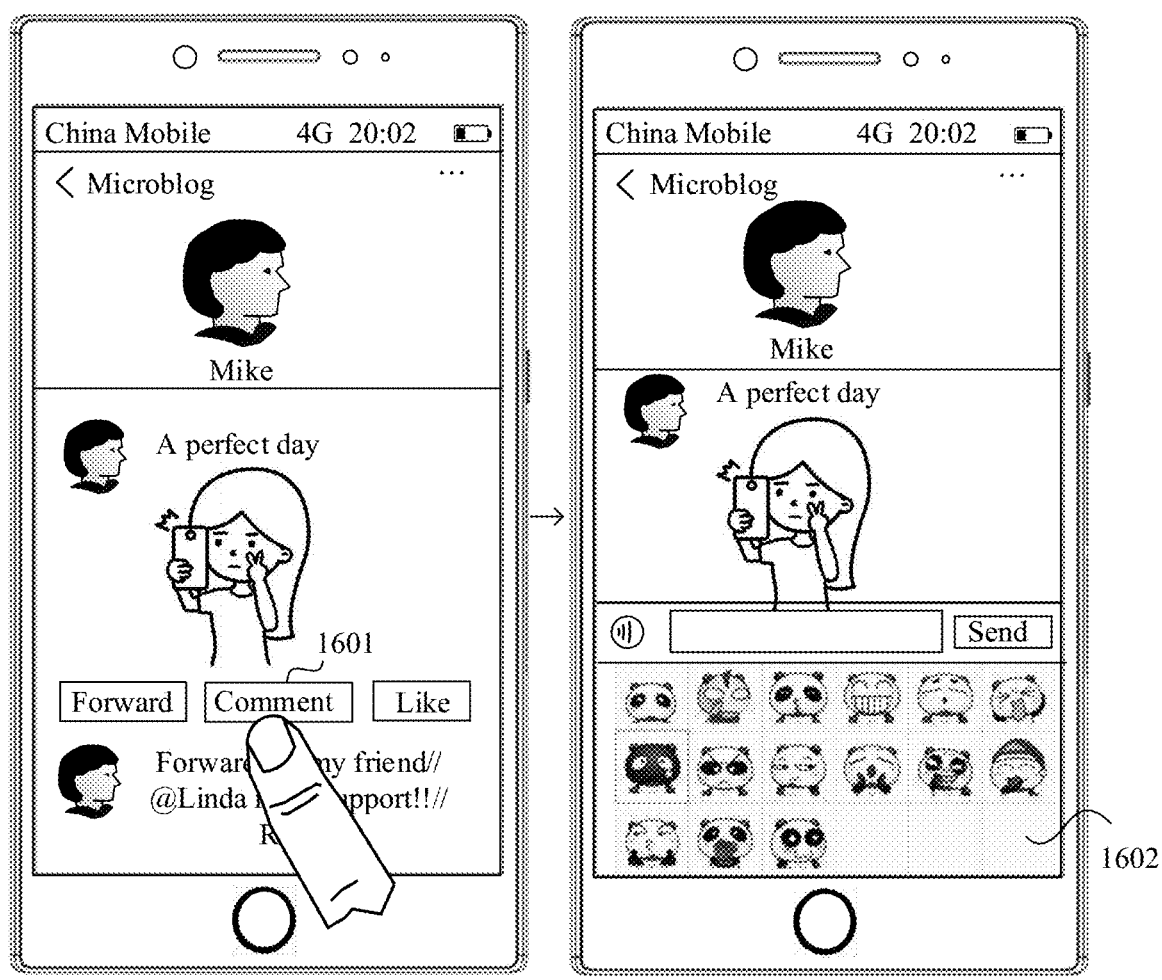
FIG. 16 is a ninth schematic diagram of a scenario where an input method virtual keyboard is displayed according to an embodiment of this application.

For example, as shown in FIG. 16, the terminal displays a microblog message list of a contact in a microblog application. If the terminal detects that the user clicks a comment button 1601 of a microblog message, the terminal may determine, based on a specific type of content of the microblog message, a type of a virtual keyboard to be displayed. For example, if the foregoing microblog message is a microblog message of an image type, the terminal may determine that the virtual keyboard to be displayed is an image keyboard, and the terminal displays the image keyboard 1602 on the current interface in response to the user's operation of clicking the comment button 1601.

For another example, the terminal may alternatively determine the type of the virtual keyboard to be displayed according to a specific type of a comment or a reply in the microblog. For example, the terminal may obtain a type of the latest comment of the microblog, and if the comment is of an emoticon type, the terminal may determine that the virtual keyboard to be displayed is an emoticon keyboard corresponding to the emoticon type. For another example, the terminal may analyze a specific type (for example, an emoticon type, a text type, or an image type) of each comment in the microblog, so that the terminal may determine, through calculation, a type of the comments whose quantity is the largest. If the quantity of comments of the text type is the largest, the terminal may determine that the virtual keyboard to be displayed is the text keyboard; or if the quantity of comments of the emoticon type is the largest, the terminal may determine that the virtual keyboard to be displayed is an emoticon keyboard. This is not limited in this embodiment of this application.

Figure 17:
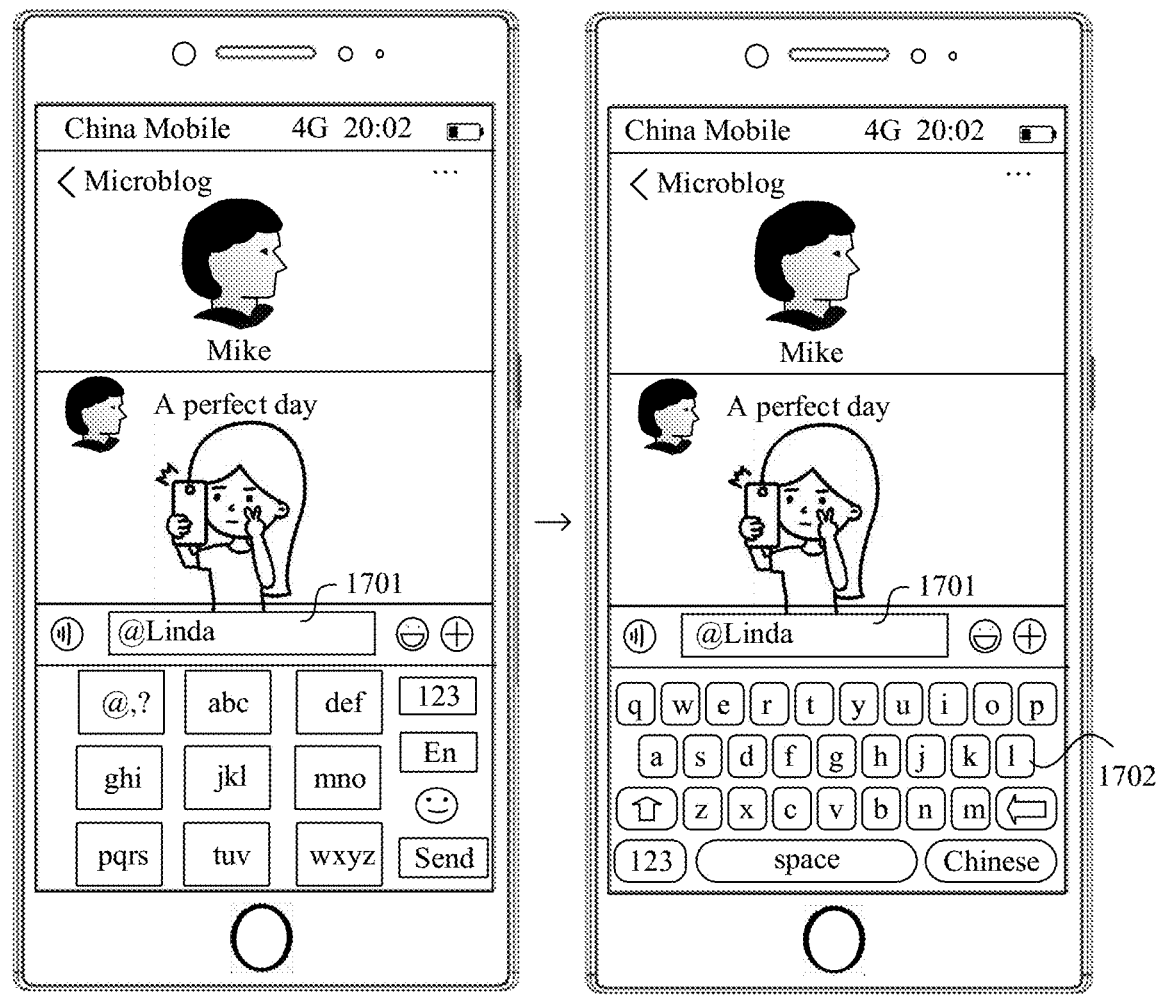
FIG. 17 is a fourth schematic diagram of a scenario where an input method virtual keyboard is switched according to an embodiment of this application.

For another example, as shown in FIG. 17, still using the comment on the foregoing microblog message as an example, when the user inputs "@Linda" into an input box 1701 to instruct the contact Linda to view the comment message, the terminal may determine, based on the nationality of the contact Linda when registering a microblog account, the type of the virtual keyboard to be displayed. For example, when Linda registers the microblog account in the United States, the terminal may determine that the virtual keyboard to be displayed is an English keyboard, and switch from the keyboard currently displayed to an English keyboard 1702.

In this way, when reviewing or forwarding a message sent by a contact, the terminal may display a virtual keyboard corresponding to a type of the message. In this way, when using the virtual keyboard of the input method APP, the terminal can automatically provide the user with the virtual keyboard satisfying the current input scenario, so that the user does not need to switch the virtual keyboard for a plurality of times.

Figure 18A:
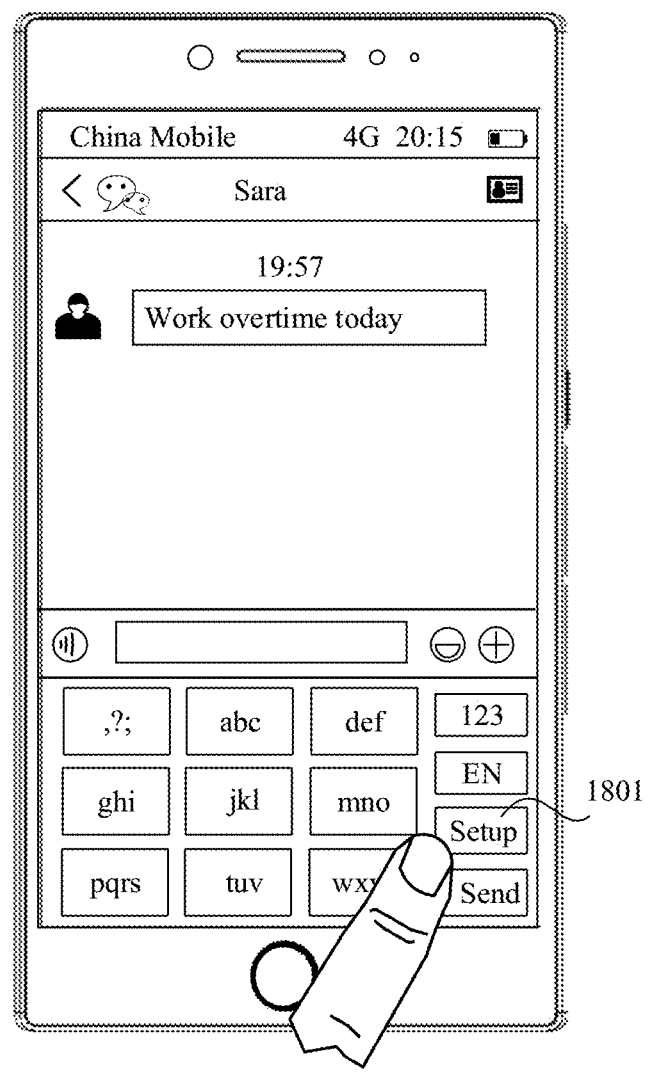
FIG. 18A and FIG. 18B are a schematic diagram of a series of scenarios where an input method virtual keyboard is set according to an embodiment of this application.

In some other embodiments of this application, as shown in FIG. 18A, the virtual keyboard (for example, the foregoing voice keyboard, emoticon keyboard, or text keyboard) displayed by the terminal on the foregoing chat interface may further include a setting button 1801, where the setting button 1801 may be used to disable the function of automatically switching the virtual keyboard for the user by the terminal based on the type (or a usage habit of the user) of the chat message.

That is, when the function of automatically switching the virtual keyboard for the user has been disabled, if the terminal detects that the user clicks the setting button 1801, the terminal may enable the function of automatically switching the virtual keyboard for the user. Subsequently, the terminal can automatically switch the corresponding virtual keyboard for the user based on the type of the chat message on the chat interface, so as to provide the user with the virtual keyboard satisfying the current input scenario, so that the user does not need to switch the virtual keyboard for a plurality of times.

Correspondingly, when the function of automatically switching the virtual keyboard for the user has been enabled, if the terminal detects that the user clicks the setting button 1801, the terminal may disable the function of automatically switching the virtual keyboard for the user. Subsequently, the terminal does not automatically switch the corresponding virtual keyboard for the user based on the type of the chat message on the chat interface, so that the terminal does not need to frequently switch the virtual keyboard, thereby improving user experience of the user when the user uses the input method.

Figure 18B:
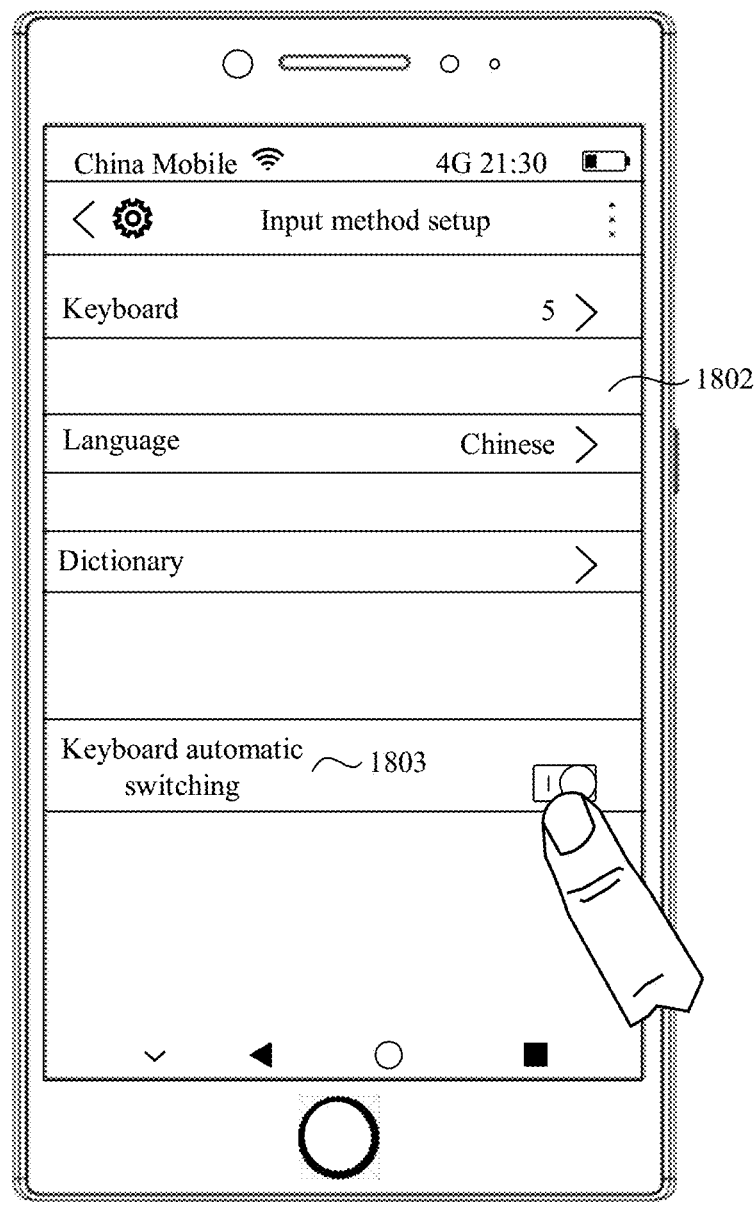

For another example, if the terminal detects that the user clicks the setting button 1801, the terminal may also jump to an input method setting interface 1802 of the APP. In this case, as shown in FIG. 18B, the input method setting interface 1802 may include a function option 1803 that is used to enable or disable the function of automatically switching, based on the type of the chat message, the virtual keyboard for the user by the terminal. In this way, the user can manually enable or disable the function option 1803 on the input method setting interface 1802, and select the input method based on the user's input habit. Certainly, the user may open the input method setting interface 1802 of the APP, and then enable or disable the function option 1803. This is not limited in this embodiment of this application.

Figure 19:
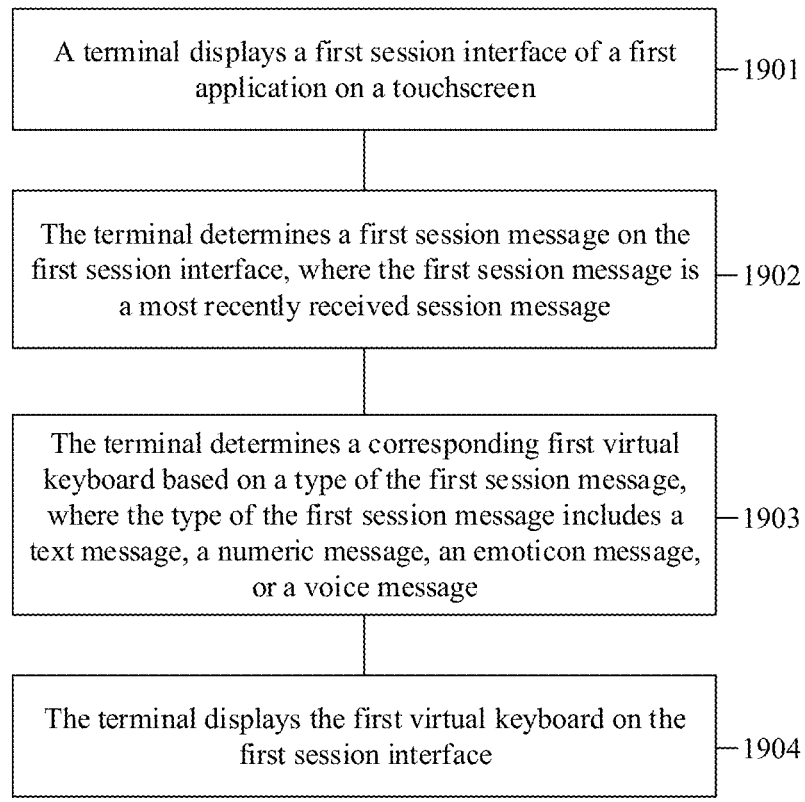
FIG. 19 is a schematic flowchart fourth schematic diagram of a method for switching an input method virtual keyboard according to an embodiment of this application.

With reference to the foregoing embodiments and corresponding accompanying drawings, an embodiment of this application provides a method for displaying/switching an input method virtual keyboard, where the method can be implemented on the terminal shown in FIG. 1 or FIG. 2. As shown in FIG. 19, the method may include the following steps:

Step 1901: A terminal displays a first session interface of a first application on a touchscreen.

The first application may be a chat application such as WeChat, Alipay, or microblog.

In some embodiments, the first session interface may be a chat interface with a first contact, for example, the chat interface with Sara 604 in FIG. 6B or FIG. 8B. In this case, the first session message refers to a chat message recently sent by the first contact, for example, the latest voice message 606 sent by Sara in FIG. 6B.

In some other embodiments, the first session interface may alternatively be a chat interface during a session with a group, such as the chat interface in FIG. 12, FIG. 14A, or FIG. 14B with the group named "My friends". In this case, the first session message refers to a chat message recently sent by a contact in the group, for example, the latest voice message 1012 sent by Mike in FIG. 12. Alternatively, the first session interface may be a session interface in a social scenario such as replying, forwarding, or commenting, for example, a microblog comment interface in FIG. 16. This is not limited in this embodiment of this application.

In addition, before the terminal displays the first session interface, a contact session list (for example, the contact session list 601 shown in FIG. 6A) of the first application may be displayed. The contact session list includes at least one chat item. These chat items may be chat items with a contact (for example, the chat items 602 and 603 in FIG. 6A) or chat items with a group (for example, the chat item 600 in FIG. 6A). When detecting an operation of opening a chat item (namely, a target chat item) in the contact session list 601, the terminal may jump from the contact session list 601 to the first session interface of the target chat item.

Step 1902: The terminal determines a first session message on the first session interface, where the first session message is a recently received session message.

For example, the first session message may be the latest session message received on the first session interface, or may be the latest session message of received from a contact on the first session interface. This is not limited in this embodiment of this application.

For example, the terminal may identify the first session message on the first session interface by using the OCR technology, may obtain the first chat message by obtaining buffered data of the current display frame, or may obtain the first chat message by invoking an interface provided by WeChat. For a method for obtaining the first session message, reference may be made to the related description in the foregoing embodiment. Therefore, details are not described herein again.

Step 1903: The terminal determines a corresponding first virtual keyboard based on a type of the first session message, where the type of the first session message includes a text message, a numeric message, an emoticon message, or a voice message.

Virtual keyboards provided by the input method APP may be divided into a plurality of types: a text keyboard, a numeric keyboard, a symbol keyboard, an emoticon keyboard, a voice keyboard, and the like. Text keyboards may further include a plurality of types of keyboards such as a Chinese keyboard and an English keyboard; and emoticon keyboards may further include a plurality of types of keyboards such as an emoji keyboard, a kaomoji keyboard, or the emoticon keyboard shown in FIG. 4A-FIG. 4C.

For example, when the type of the first session message is a voice type, the input method APP running on the terminal may determine the voice keyboard corresponding to the voice type as the first virtual keyboard. When the type of the first session message is a Chinese text type, the first virtual keyboard corresponding to the first session message may be a pinyin keyboard of a nine-grid type or a pinyin keyboard of a full-keyboard type; when the type of the first session message is a numeric type, the first virtual keyboard corresponding to the first session message may be a numeric keyboard; or when the type of the first session message is an emoticon type, the first virtual keyboard corresponding to the first session message may be an emoticon keyboard. When a plurality of emoticon keyboards supported by the input method APP, the terminal may determine, based on the specific emoticon type of the first session message, that the virtual keyboard corresponding to the virtual keyboard is an emoji keyboard, a kaomoji keyboard, or an emoticon package keyboard.

Step 1904: The terminal displays the first virtual keyboard on the first session interface.

That is, the terminal may display a virtual keyboard of a corresponding type based on the type of the first session message. For example, when the type of the first session message is a voice type, the input method APP running on the terminal may determine the voice keyboard corresponding to the voice type as the first virtual keyboard. In this way, when the user opens the virtual keyboard, the terminal can automatically display a virtual keyboard matching the type of the chat message based on the latest chat message, thereby reducing operations of the user to frequently switch the virtual keyboard in the process of inputting information using the input method APP, and improving the input efficiency of the terminal and the input experience of the user.

After the terminal displays the first virtual keyboard on the first session interface, the user can chat with a contact on the first session interface using the first virtual keyboard. In this case, the first session interface generates a newly received second session message, for example, the emoticon message 1102 in FIG. 13. The terminal may determine a corresponding second virtual keyboard (for example, the emoticon keyboard 1103 in FIG. 13) based on a type of the second session message, and then display the second virtual keyboard on the first session interface and hide the first virtual keyboard. In this way, the terminal can switch from the first virtual keyboard currently displayed to the second virtual keyboard on the first session interface, so as to implement automatic switching between different virtual keyboards in the chat process.

For another example, after the terminal displays the first virtual keyboard on the first session interface, the user may input a specific character (such as "@" or "#") and a contact into the input box on the first session interface, so as to instruct the contact to view a chat message sent by the user. Therefore, if the terminal receives a specific character and a first contact that are input by the user into the input box, such as "@Mike" input in FIG. 14A, the terminal may determine a session message recently transmitted by the first contact in the group as a third session message; for example, the recently received voice message 1404 from Mike is determined as the third session message. Further, the terminal may determine the corresponding third virtual keyboard based on a type of the third session message, display the third virtual keyboard on the first session interface, and hide the first virtual keyboard originally displayed. For example, in FIG. 14B, a Chinese keyboard 1402 is switched to a voice keyboard 1405 corresponding to the voice message 1404 sent by Mike.

For another example, after the terminal displays the first virtual keyboard on the first session interface, if a specific character input by the user into the input box and the first contact (for example, "@Linda" input by the user into an input box 1701 shown in FIG. 17) are detected, the terminal may determine a nationality of the first contact, display a virtual keyboard corresponding to the nationality of the first contact on the first session interface, and hide the first virtual keyboard originally displayed. For example, the Chinese keyboard shown in FIG. 17 is switched to an English keyboard 1702 corresponding to the nationality of Linda.

For another example, the terminal may display a second session interface of a second application different from the first application on the touchscreen. For example, the second session interface may be a chat interface with Alice in the QQ application in FIG. 15B. The terminal may determine a fifth session message on the second session interface, where the fifth session message refers to a session message recently received on the second session interface, for example, an emoticon message 1201 in FIG. 15B. The terminal may determine a corresponding fifth virtual keyboard provided by the second input method application based on a type of the fifth session message, and display the fifth virtual keyboard on the second session interface, for example, the emoticon keyboard 1203 corresponding to the emoticon message 1201 provided by the input method application B in FIG. 15B.

Figure 20:
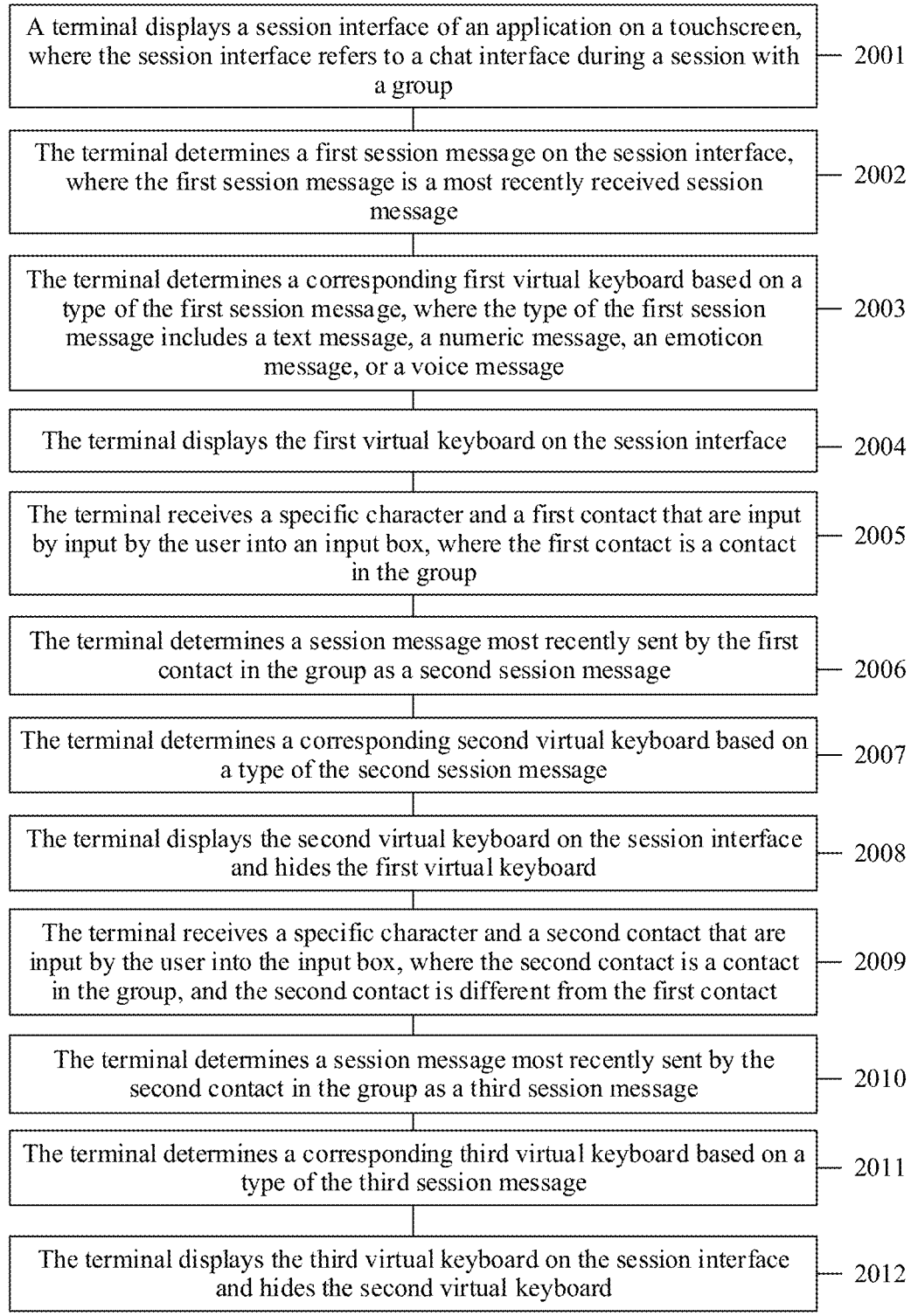
FIG. 20 is a schematic flowchart fourth schematic diagram of a method for displaying an input method virtual keyboard according to an embodiment of this application.

With reference to the foregoing embodiments and corresponding accompanying drawings, an embodiment of this application provides a method for displaying/switching an input method virtual keyboard in a group session scenario, where the method can be implemented on the terminal as shown in FIG. 1 or FIG. 2. As shown in FIG. 20, the method may include the following steps:

Step 2001: The terminal displays a session interface of an application on a touchscreen, where the session interface refers to a chat interface during a session with a group.

Step 2002: The terminal determines a first session message on the session interface, where the first session message is a recently received session message.

Step 2003: The terminal determines a corresponding first virtual keyboard based on a type of the first session message, where the type of the first session message includes a text message, a numeric message, an emoticon message, or a voice message.

Step 2004: The terminal displays the first virtual keyboard on the session interface.

For an implementation method of steps 2001 to 2004, reference may be made to detailed descriptions of steps 1901 to 1904 and related accompanying drawings. Therefore, details are not described herein again.

Step 2005: The terminal receives a specific character and a first contact that are input by input by the user into an input box, where the first contact is a contact in the group.

Step 2006: The terminal determines a session message recently sent by the first contact in the group as a second session message.

Step 2007: The terminal determines a corresponding second virtual keyboard based on a type of the second session message.

Step 2008: The terminal displays the second virtual keyboard on the session interface and hides the first virtual keyboard.

In steps 2005 to 2008, after the terminal displays the first virtual keyboard on the session interface, the user may input a specific character (such as "@" or "#") and a first contact into an input box on the session interface, so as to instruct the first contact to view a chat message sent by the user. For example, as shown in FIG. 14A, the user inputs "@Mike" on the chat interface of the group "My friends". Further, the terminal may determine the session message recently sent by the first contact in the group as the second session message; for example, a voice message 1404 recently received from Mike is determined as the second session message. Further, the terminal may determine a corresponding third virtual keyboard based on a type of the third session message, display the third virtual keyboard on the first session interface, and hide the originally displayed first virtual keyboard. For example, as shown in FIG. 14B, the terminal switches from the originally displayed Chinese keyboard 1402 to the voice keyboard 1405 corresponding to the voice message 1404 sent by Mike.

Step 2009: The terminal receives a specific character and a second contact that are input by the user into the input box, where the second contact is a contact in the group, and the second contact is different from the first contact.

Step 2010: The terminal determines a session message recently sent by the second contact in the group as a third session message.

Step 2011: The terminal determines a corresponding third virtual keyboard based on a type of the third session message.

Step 2012: The terminal displays the third virtual keyboard on the session interface and hides the second virtual keyboard.

The third virtual keyboard, the second virtual keyboard, and the first virtual keyboard are different from each other.

In steps 2009 to 2012, after the terminal displays the second virtual keyboard on the session interface, the user may further continue to input a specific character (for example, "@" or "#") and a second contact into the input box on the session interface, so as to instruct the second contact to view a chat message sent by the user. For example, the user may input "@Sara" on the chat interface of the group "My friends" in FIG. 14A or FIG. 14B. Further, the terminal may determine the session message recently sent by the second contact in the group as the second session message; for example, the latest Chinese text message received from Sara is determined as a third session message. Further, the terminal may determine a corresponding third virtual keyboard based on a type of the third session message, display the third virtual keyboard on the first session interface, and hide the second virtual keyboard originally displayed, for example, switch from the voice keyboard 1405 displayed in FIG. 14B to the Chinese keyboard corresponding to the Chinese text message sent by Sara.

Figure 21:
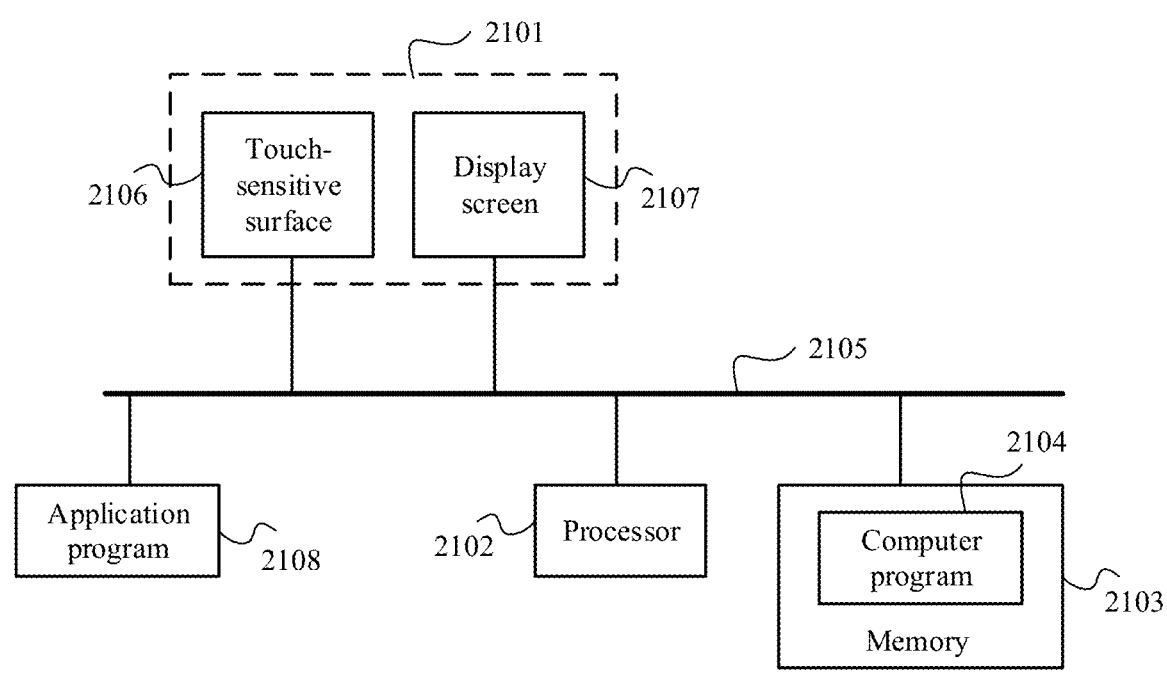
FIG. 21 is a schematic structural diagram of a terminal according to an embodiment of this application.

As shown in FIG. 21, another embodiment of this application discloses a terminal. The terminal may include a touchscreen 2101, where the touchscreen 2101 includes a touch-sensitive surface 2106 and a display screen 2107; one or more processors 2102; a memory 2103; a plurality of application programs 2108; and one or more computer programs 2104. Each of the foregoing devices may be connected using one or more communications buses 2105. The one or more computer programs 2104 are stored in the memory 2103 and configured to be executed by the one or more processors 2102, where the one or more computer programs 2104 includes instructions that may be used to perform the steps in FIG. 19-FIG. 20 and corresponding embodiments.

The foregoing descriptions about implementations allow a person skilled in the art to understand that, for the purpose of convenient and brief description, division of the foregoing function modules is taken as an example for illustration. In actual application, the foregoing functions can be allocated to different modules and implemented according to a requirement, that is, an inner structure of an apparatus is divided into different function modules to implement all or some of the functions described above. For a detailed working process of the foregoing system, apparatus, and unit, refer to a corresponding process in the foregoing method embodiments, and details are not described herein again.

Functional units in the embodiments of this application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the embodiments of this application essentially, or the part contributing to the prior art, or all or some of the technical solutions may be implemented in the form of a software product. The software product is stored in a storage medium and includes several instructions for instructing a computer device (which may be a personal computer, a server, or a network device) to perform all or some of the steps of the methods described in the embodiments of this application. The foregoing storage medium includes: any medium that can store program code, such as a flash memory, a removable hard disk, a read-only memory, a random access memory, a magnetic disk, or an optical disc.

The foregoing descriptions are merely specific implementations of this application, but are not intended to limit the protection scope of this application. Any variation or replacement within the technical scope disclosed in this application shall fall within the protection scope of this application. Therefore, the protection scope of the embodiments of this application shall be subject to the protection scope of the claims.

What is claimed is:

1. A method for displaying a virtual keyboard, comprising:
    displaying, by a terminal, a first session interface of a first application on a touchscreen; wherein the first session interface comprises an input box;
    determining, by the terminal, a first session message in the first session interface, wherein the first session message is a latest session message in the first session interface, wherein the first session interface refers to a chat interface of a chatting group, and the first session message refers to a latest message sent by a contact in the chatting group;
    determining, by the terminal, the corresponding first virtual keyboard based on a type of the first session message, wherein the type of the first session message comprises a text message, a numeric message, an emoticon message, or a voice message;
    displaying, by the terminal, the first virtual keyboard in the first session interface;
    receiving, by the terminal, a specific character and a plurality of contacts that are input by a user into the input box, wherein the plurality of contacts are contacts in the chatting group;
    determining, by the terminal, a most frequent contact among the plurality of contacts as a first contact;
    determining, by the terminal, a third session message from the first contact among the plurality of contacts in the chatting group, wherein the third session message is a latest message from the first contact among the plurality of contacts;
    determining, by the terminal, a corresponding third virtual keyboard based on a type of the third session message; and
    displaying, by the terminal, the third virtual keyboard in the first session interface, and hiding the first virtual keyboard.

2. The method according to claim 1, wherein after displaying, by the terminal, the first virtual keyboard in the first session interface, the method further comprises:
    determining, by the terminal, a second session message in the first session interface, wherein the second session message is a latest message in the first session interface;
    determining, by the terminal, a corresponding second virtual keyboard based on a type of the second session message; and
    displaying, by the terminal, the second virtual keyboard in the first session interface, and hiding the first virtual keyboard.

3. The method according to claim 1, wherein after displaying, by the terminal, the third virtual keyboard in the first session interface, the method further comprises:
    receiving, by the terminal, a specific character and a second contact that are input by the user into the input box, wherein the second contact is a contact in the chatting group;
    determining, by the terminal, a fourth session message from the second contact in the chatting group, wherein the fourth session message is a latest message from the second contact;
    determining, by the terminal, a corresponding fourth virtual keyboard based on a type of the fourth session message; and
    displaying, by the terminal, the fourth virtual keyboard in the first session interface, and hiding the third virtual keyboard.

4. The method according to claim 1, wherein after displaying, by the terminal, the first virtual keyboard in the first session interface, the method further comprises:
    receiving, by the terminal, a specific character and a third contact that are input by a user into the input box;
    determining, by the terminal, a nationality of the third contact; and
    displaying, by the terminal, a virtual keyboard corresponding to the nationality of the third contact in the first session interface, and hiding the first virtual keyboard.

5. The method according to claim 1, wherein the first virtual keyboard is a keyboard provided by a first input method application, the method further comprising:
    displaying, by the terminal, a second session interface of a second application on the touchscreen;
    determining, by the terminal, a fifth session message in the second session interface, wherein the fifth session message is a latest session message in the second session interface;
    determining, by the terminal, a corresponding fifth virtual keyboard based on a type of the fifth session message, wherein the fifth virtual keyboard is a keyboard provided by a second input method application; and
    displaying, by the terminal, the fifth virtual keyboard in the second session interface.

6. The method according to claim 5, wherein the type of the fifth session message is the same as the type of the first session message, and the type of the fifth virtual keyboard is the same as the type of the first virtual keyboard.

7. The method according to claim 1, wherein before displaying, by a terminal, a first session interface of a first application on a touchscreen, the method further comprises:
    displaying, by the terminal, a contact session list of the first application on the touchscreen, wherein the contact session list comprises at least one chat item, and the chat item comprises a chat item of a contact or a chat item of a group; and
    the displaying, by a terminal, a first session interface of a first application on a touchscreen comprises:
    displaying, by the terminal in response to an operation of opening a target chat item, a first session interface of the target chat item on the touchscreen.

8. The method according to claim 1, wherein before displaying, by the terminal, the first virtual keyboard in the first session interface, the method further comprises:
    determining, by the terminal, a time interval between a receiving time of the first session message and a current time;
    in response to the time interval being greater than a predetermined time, determining, by the terminal, a corresponding first virtual keyboard being a default virtual keyboard, wherein the default virtual keyboard is independent on the type of the first session message; and
    in response to the time interval being less than or equal to the predetermined time, determining, by the terminal, the corresponding first virtual keyboard based on a type of the first session message, wherein the type of the first session message comprises a text message, a numeric message, an emoticon message, or a voice message.

9. The method according to claim 8, wherein the current time is determined as a time when the terminal detects a touch operation on the input box by a user.

10. A terminal, comprising:
a touchscreen;
one or more processors; and
a memory storing one or more computer programs, wherein the one or more computer programs comprise instructions, and when the instructions are executed by the terminal, the terminal is enabled to perform:
displaying a session interface of an application on the touchscreen, wherein the session interface refers to a chat interface during a session with a chatting group;
determining a first session message in the session interface, wherein the first session message is a latest session message in the session interface;
determining a corresponding first virtual keyboard based on a type of the first session message, wherein the type of the first session message comprises a text message, a numeric message, an emoticon message, or a voice message;
displaying, in response to a touch operation on an input box in the session interface, the first virtual keyboard in the session interface;
receiving a specific character and a plurality of contacts that are input by a user into the input box, wherein the plurality of contacts are contacts in the chatting group;
determining a most frequent contact among the plurality of contacts as a first contact;
determining a second session message from the first contact among the plurality of contacts in the chatting group, wherein the second session message is a latest session message from the first contact among the plurality of contacts;
determining a corresponding second virtual keyboard based on a type of the second session message; and
displaying the second virtual keyboard in the session interface, and hiding the first virtual keyboard.

11. A terminal, comprising:
a touchscreen;
one or more processors; and
a memory storing one or more computer programs, wherein the one or more computer programs comprise instructions, and when the instructions are executed by the terminal, the terminal is enabled to perform:
displaying a first session interface of a first application on a touchscreen;
determining a first session message in the first session interface, wherein the first session message is a latest session message in the first session interface;
determining a corresponding first virtual keyboard based on a type of the first session message, wherein the type of the first session message comprises a text message, a numeric message, an emoticon message, or a voice message;
displaying the first virtual keyboard in the first session interface, wherein the first session interface comprises an input box, and wherein the first session interface refers to a chat interface during a session with a chatting group, and the first session message refers to a latest chat message from a contact in the chatting group;
receiving a specific character and a plurality of contacts that are input by a user into the input box, wherein the plurality of contacts are contacts in the chatting group;
determining a most frequent contact among the plurality of contacts as a first contact;
determining a third session message from the first contact among the plurality of contacts in the chatting group, wherein the third session message is a latest session message from the first contact among the plurality of contacts;
determining a corresponding third virtual keyboard based on a type of the third session message; and
displaying the third virtual keyboard in the first session interface, and hiding the first virtual keyboard.

12. The terminal according to claim 11, wherein when the instructions are executed by the terminal, the terminal is further configured to perform:
displaying a second session message in the first session interface, wherein the second session message is a latest message in the first session interface;
determining a corresponding second virtual keyboard based on a type of the second session message; and
displaying the second virtual keyboard in the first session interface, and hiding the first virtual keyboard.

13. The terminal according to claim 11, wherein when the instructions are executed by the terminal, the terminal is further configured to perform:
receiving a specific character and a second contact that are input by the user into the input box, wherein the second contact is a contact in the chatting group;
determining a fourth session message from the second contact in the chatting group, wherein the fourth session message is a latest session message from the second contact;
determining a corresponding fourth virtual keyboard based on a type of the fourth session message; and
displaying the fourth virtual keyboard in the first session interface, and hiding the third virtual keyboard.

14. The terminal according to claim 11, wherein when the instructions are executed by the terminal, the terminal is further configured to perform:
receiving a specific character and a third contact that are input by a user into the input box;
determining a nationality of the third contact; and
displaying a virtual keyboard corresponding to the nationality of the third contact in the first session interface, and hiding the first virtual keyboard.

15. The terminal according to claim 11, wherein the first virtual keyboard is a keyboard provided by a first input method application, and when the instructions are executed by the terminal, the terminal is further configured to perform:
displaying a second session interface of a second application on the touchscreen;
determining a fifth session message in the second session interface, wherein the fifth session message is a latest session message in the second session interface; and
determining a corresponding fifth virtual keyboard based on a type of the fifth session message, wherein the fifth virtual keyboard is a keyboard provided by a second input method application; and
displaying the fifth virtual keyboard in the second session interface.

16. The terminal according to claim 11, wherein before displaying the first session interface of a first application on a touchscreen, the terminal is further configured to perform:
displaying a contact session list of the first application on the touchscreen, wherein the contact session list comprises at least one chat item, and the chat item comprises a chat item of a contact or a chat item of a group; and
wherein displaying the first session interface of the first application on the touchscreen comprises:

displaying, in response to an operation of opening a target chat item, the first session interface of the target chat item on the touchscreen.

17. The terminal according to claim 11, wherein before displaying the first virtual keyboard in the first session interface, the terminal is further configured to perform:
determining a time interval between a receiving time of the first session message and a current time;
in response to the time interval being greater than a predetermined time, determining, by the terminal, the corresponding first virtual keyboard being a default virtual keyboard, wherein the default virtual keyboard is independent on the type of the first session message; and
in response to the time interval being less than or equal to the predetermined time, determining the corresponding first virtual keyboard based on a type of the first session message, wherein the type of the first session message comprises a text message, a numeric message, an emoticon message, or a voice message.

18. The terminal according to claim 17, wherein the current time is determined as a time when the terminal detects a touch operation on the input box by a user.

\* \* \* \* \*

UNITED STATES PATENT AND TRADEMARK OFFICE
CERTIFICATE OF CORRECTION

| | | |
|---|---|---|
| PATENT NO. | : 11,681,432 B2 | Page 1 of 1 |
| APPLICATION NO. | : 17/054444 | |
| DATED | : June 20, 2023 | |
| INVENTOR(S) | : Wu et al. | |

It is certified that error appears in the above-identified patent and that said Letters Patent is hereby corrected as shown below:

On the Title Page

Applicant item (71): "Honor Device Co., Ltd., Guangdong (CN)" should read -- Honor Device Co., Ltd., Shenzhen (CN) --.

PCT Pub. Date item (87): "Nov. 4, 2019" should read -- Nov. 14, 2019 --.

Signed and Sealed this
Eighth Day of August, 2023

*Katherine Kelly Vidal*

Katherine Kelly Vidal
*Director of the United States Patent and Trademark Office*